US008360836B2

(12) United States Patent
Takehiro

(10) Patent No.: US 8,360,836 B2
(45) Date of Patent: Jan. 29, 2013

(54) GAMING DEVICE, GAME PROCESSING METHOD AND INFORMATION MEMORY MEDIUM

(75) Inventor: Masashi Takehiro, Tokyo (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 140 days.

(21) Appl. No.: 12/830,642

(22) Filed: Jul. 6, 2010

(65) Prior Publication Data

US 2011/0003639 A1 Jan. 6, 2011

(30) Foreign Application Priority Data

Jul. 6, 2009 (JP) .................................. 2009-160192

(51) Int. Cl.
  *A63F 13/00* (2006.01)
(52) U.S. Cl. ............................................. 463/7; 463/36
(58) Field of Classification Search .................. 463/7, 36
  See application file for complete search history.

(56) References Cited

U.S. PATENT DOCUMENTS

2009/0122018 A1\* 5/2009 Vymenets et al. ............ 345/173

FOREIGN PATENT DOCUMENTS

JP 3003851 11/1999
JP 3361084 10/2002

OTHER PUBLICATIONS

DJ Hero Review for Xbox 360 IGN Daemon Hatfield Oct. 26, 2009.\*
DJ Hero controller gets FCC teardown, flaunts manual Slash Gear Chris Davies Aug. 28, 2009.\*
Youtube Video of DJ Hero We Will Rock You/ Robot Rock Oct. 29, 2009.\*

\* cited by examiner

*Primary Examiner* — Peter DungBa Vo
*Assistant Examiner* — Jeffrey Wong
(74) *Attorney, Agent, or Firm* — Howard & Howard Attorneys PLLC

(57) ABSTRACT

In a gaming device, an input receiving unit receives an instruction input to specify a position where a moving object is to be arranged. The moving object is movable in a predetermined pathway. A memory unit stores, for each of a plurality of timings, a timing and a position where the moving object is to be placed at that timing in association with each other. For each of the plurality of timings, a sound outputting unit determines whether a position stored in the memory unit in association with a timing matches a position specified by a latest instruction input received by the input receiving unit. When the positions match, the sound outputting unit outputs a sound associated with the matching position.

10 Claims, 16 Drawing Sheets

FIG. 6

| ITEM NUMBER | TIMING | POSITION |
|---|---|---|
| 1 | FIRST BAR, FIRST BEAT | $(X_1, Y_1)$ |
| 2 | SECOND BAR, THIRD BEAT | $(X_2, Y_2)$ |
| ... | ... | ... |
| N | n-TH BAR, m-TH BEAT | $(X_N, Y_N)$ |

FIG. 10

| ITEM NUMBER | TIMING | POSITION | OUTPUT TIME LENGTH |
|---|---|---|---|
| 1 | FIRST BAR, FIRST BEAT | $(X_1, Y_1)$ | $L_1$ |
| 2 | SECOND BAR, THIRD BEAT | $(X_2, Y_2)$ | $L_2$ |
| ... | ... | ... | ... |
| N | n-TH BAR, m-TH BEAT | $(X_N, Y_N)$ | $L_N$ |

GAMING DEVICE, GAME PROCESSING METHOD AND INFORMATION MEMORY MEDIUM

CROSS-REFERENCE TO RELATED APPLICATION

This application claims the benefit of Japanese Patent Application No. 2009-160192, filed on Jul. 6, 2009, the entire disclosure of which is incorporated by reference herein.

FIELD

The present application relates generally to gaming devices, and more particularly to, a gaming device that realizes a game allowing a player to obtain the feeling of playing various musical instruments through a simple operation. A game processing method and an information memory medium is also disclosed.

BACKGROUND

Recently, music games have become widespread, and players of all generations enjoy such games. For example, according to a dancing game device disclosed in Japanese Patent No. 3003851, a player steps in accordance with successive instructions. Accordingly, the player can enjoy dancing to the rhythms as if the player is dancing at a nightclub.

Moreover, games which allow a player to easily experience playing of instruments are in demand. For example, according to a gaming system disclosed in Japanese Patent No. 3361084, operating elements are arranged like a keyboard instrument along a musical scale. This gaming system changes an operation element to be depressed to a high-pitch sound or to a low-pitch sound so that the operating range of the operating elements becomes narrower than an original music. According to such a gaming system, a player can enjoy playing of various musical instruments having operating elements arranged in accordance with a musical scale.

SUMMARY

According to the foregoing conventional technologies, plurality of buttons (or keys) are arranged at predetermined positions. A player dances or plays instruments by depressing the buttons or the like at a predetermined timing. Therefore, it is necessary for the player to memorize the arrangement of the large number of buttons. Moreover, it is necessary for the player to instantaneously figure out a correspondence relation between the large number of arranged buttons and the content of an instruction mark displayed in a game image. However, a beginner would not get accustomed to selecting an appropriate button from the plurality of buttons. Therefore, operation of conventional games using conventional technology may be difficult for a beginner.

The present application has been made to overcome the foregoing problem, and it is an object of the embodiments disclosed in the present application to provide a gaming device that allows a player to obtain the feeling of playing various musical instruments through a simple operation. Also disclosed is a game processing method and an information memory medium.

In order to achieve the object, the present application is disclosed as follows based on the principle of the present application.

A gaming device according to a first aspect of the present application comprises an input receiving unit, a memory unit, and a sound outputting unit.

The input receiving unit receives an instruction input that specifies a position where a moving object movable in a predetermined pathway is to be placed.

The memory unit stores a plurality of timings and a plurality of positions where the moving object is to be placed, each of the plurality of timings and each of the plurality of positions being associated with each other.

At each of the plurality of timings, when the position specified by the instruction input received at one of the plurality of timings matches one of the plurality of positions stored in association with that timing, the sound outputting unit outputs a sound associated with the matching position.

The gaming device of the present application typically executes a music game that allows a player to play a wind instrument like a trombone in a simulated manner. As the game starts, for example, musical performance of an orchestra other than a trombone part is played. The player takes a part of trombone, and plays the trombone in a simulated manner. The player moves a virtual slide, thereby playing the trombone with various pitches in a simulated manner. Alternatively, the player may play not a wind instrument but a string instrument like a violin in a simulated manner. In this case, the player moves a position of a virtual left hand, thereby playing the violin with various pitches in a simulated manner.

The music game receives an instruction of, for example, operating a musical instrument displayed on a screen from the player. Therefore, the player can enjoy playing of the musical instrument in the screen in a simulated manner. One or more moving objects are arranged on the screen. The player can move the moving object toward a predetermined pathway. A position where the moving object is arranged corresponds to a position of a slide of a trombone or a position of a left hand for a violin. In this game, the timing that the moving object must be moved and the position where the moving object must be moved at that timing are set. For example, the timing that the slide of a trombone must be moved and a position where the slide must be arranged at that timing are set beforehand. A combination of the timing and the position are called a "game task".

According to this game, a musical-instrument type controller may be used. The gaming device receives an operation input from the connected musical-instrument type controller. In this case, the player can enjoy a feeling of playing a musical instrument using the musical-instrument type controller.

The player can input an instruction of moving the slide at an arbitrary timing. When following two conditions are satisfied, a sound of a musical instrument is generated:

(a) a timing that the player inputs an instruction matches a timing of any one of game tasks; and (b) a position of the slide at a timing that the player inputs an instruction matches a position specified by the game task.

A sound of a musical instrument to be output is a sound associated with a position specified by a game task. For example, a sound of "do", a sound of "re", and a sound of "mi" are associated with a first predetermined position, a second predetermined position, and a third predetermined position, respectively. Various sounds of a musical instrument may be associated with each position specified by a game task. As explained above, as the game starts, for example, a musical performance of an orchestra other than a trombone part or a violin part is played. As the player moves the moving object in accordance with a game task, the music is played through all musical instruments of an orchestra.

According to the present application, a game which allows a player to obtain a feeling of playing various musical instruments through a simple operation is realized. As the player merely moves the moving object to a predetermined position at a predetermined timing, the player can easily enjoy simulated playing of a musical instrument. The musical instrument to be played may be various musical instruments, such as a wind instrument like a trombone or a slide whistle, a string instrument like a violin or a musical saw.

The moving object may be a predetermined image displayed on a touch screen. The input receiving unit may receive a dragging operation to the predetermined image on the touch screen as an instruction input of specifying a destination point of the dragging operation.

For example, a panel which has a sensor of detecting contact/non-contact of a pen or a finger may be arranged on a surface of a display device. Note that a game screen is displayed on the display of the display device.

Such output device is called a touch screen. The moving object is displayed on a game screen of the music game. The player moves the moving object while touching an image associated with the moving object (this operation is generally called a "dragging"). When the player successfully drags the moving object in accordance with a game task, music is played through all musical instruments. According to the present application, a game which allows the player to obtain the feeling of playing various musical instruments through a simple dragging operation is realized. A destination point of the dragging operation refers to a point reached by the dragging operation; in other words, the destination point corresponds to a point where a predetermined image is dragged and contact with the touch screen is terminated.

The gaming device may further include a supporting body provided with a predetermined pathway.

As the player grabs and moves the supporting body, the input receiving unit may receive an instruction input of specifying a position where the moving object is to be moved.

For example, the gaming device may further include a supporting body that the player can move with a hand. The player moves the supporting body as if the player slides an object arranged on a rail. The gaming device measures a displacement that the supporting body has moved, and based on a displacement width, the moving object in the game screen is moved. That is, in response to the movement of the supporting body, the moving object moves. According to the present application, a game which allows the player to obtain a feeling of playing various musical instruments through a simple sliding operation is realized.

The memory unit may further store an output time length in association with each of the plurality of timings.

The sound outputting unit may output a sound associated with a matching position for the output time length at each of the plurality of timings.

That is, in a game task, the timing at which the moving object must be moved, the position towards which the moving object must be moved at that timing, and the length of time for maintaining the moving object at that position are associated with each other. If the player can move the moving object at a predetermined timing, or can keep the moving object still in accordance with a game task, music is played through all musical instruments. According to the present application, a game is realized which enables the player to obtain the feeling of playing various musical instruments through a simple operation. As the player moves the moving object to a predetermined position at a predetermined timing, or keeps the moving object still for a predetermined time, it becomes possible for the player to easily enjoy simulated playing of a musical instrument.

The gaming device may also include a display device which displays an instruction mark indicating one of the plurality of timings and one of the plurality of positions stored in the memory unit.

The display unit may display the instruction mark while moving the instruction mark toward a pathway as time elapses.

That is, an image indicating the content of a game task is displayed in a game screen in a scrolled manner. This image is called a "musical note". The player can move the moving object by viewing the musical note displayed. According to the disclosures of the present application, the player can enjoy simulated playing of a musical instrument through a simple operation as if the player is reading a musical score.

The sound outputting unit may output a sound with a pitch, a musical scale, or a frequency associated with a matching position. Note that in the field of music, a pitch can be expressed by a musical scale or a frequency.

That is, a sound with various pitches (musical scales or frequencies) of a musical instrument can be associated with each position in a game task. The player can enjoy playing of music through a mere simple operation.

There may be a first moving object and a second moving object as the moving object.

The input receiving unit may receive a first instruction input of specifying a position of the first moving object, and a second instruction input of specifying a position of the second moving object.

Furthermore, the memory unit may store each of the plurality of timings and a moving object position where the first moving object and/or the second moving object is/are to be moved in association with each other at each of the plurality of timings.

At each of the plurality of timings, when a position specified by the first instruction input and/or the second instruction input received by that timing matches a position stored in association with that timing, the sound outputting unit may output a sound associated with the matching position.

According to the present application, the player can play multiple musical instruments. For example, two moving objects may be arranged in one pathway. The one moving object is associated with one musical instrument. Another moving object is associated with another musical instrument. The player can obtain the feeling of playing two musical instruments simultaneously through a simple operation. Therefore, the game becomes more fun. Note that the number of moving objects may be greater than or equal to three. Individual moving objects may be arranged on different pathways.

The input receiving unit may accept, the instruction input of specifying, as the destination point reached by the dragging operation, a point where the dragging operation of the predetermined image is terminated, or a point nearby the predetermined image, at which an amount of move from a point at which the predetermined image is originally located becomes less than a predetermined value. Here, the termination of the dragging operation means that the contact with the touch panel by the player has been terminated. The position nearby the predetermined image may be an average of coordinates of the predetermined image, obtained at each time of vertical synchronization interruption.

A game processing method according to another aspect of the present application is executed by a gaming device including an input receiving unit, a memory unit, and a sound outputting unit, and comprises an input receiving step and a sound outputting step.

The memory unit stores a plurality of timings and a plurality of positions where a moving object movable in a predetermined pathway is to be placed, each of the plurality of timings and each of the plurality of positions being associated with each other.

In the input receiving step, the input receiving unit receives an instruction input of specifying a position where the moving object is to be arranged.

In the sound outputting step, the sound outputting unit outputs a sound, at each of the plurality of timings, when a position specified by an instruction input received at one of the plurality of timings matches one of the plurality of positions stored in association with that timing, the sound outputting unit outputs a sound associated with the matching position.

According to the present application, a game which allows the player to obtain a feeling of playing various musical instruments through a simple operation is realized.

An computer-readable information memory medium according to the other aspect of the present application stores a program which allows a computer to function as an input receiving unit, a memory unit, and a sound outputting unit.

The input receiving unit receives an instruction input that specifies a position where a moving object movable in a predetermined pathway is to be placed.

The memory unit stores a plurality of timings and a plurality of positions where the moving object is to be placed, each of the plurality of timings and each of the plurality of positions being associated with each other.

At each of the plurality of timings, when a position specified by an instruction input received at one of the plurality of timings matches one of the plurality of positions stored in association with that timing, the sound outputting unit outputs a sound associated with the matching position.

According to the present application, it is possible to cause a computer to function as the gaming device operating as explained above.

The computer-readable information memory medium of the present application may be a computer-readable recording medium, such as a compact disk, a flexible disk, a hard disk, a magneto-optical disk, a digital video disk, a magnetic tape, or a semiconductor memory.

The program stored in the information memory medium of the present application may be independently distributed and sold from a computer via a computer communication network. The information memory medium may be independently distributed and sold from a computer.

According to the present application, there are provided a gaming device which can realize a game that allows a player to obtain a feeling of playing various musical instruments through a simple operation, a game processing method, and an information memory medium.

BRIEF DESCRIPTION OF THE DRAWINGS

A more complete understanding of this application can be obtained when the following detailed description is considered in conjunction with the following drawings, in which:

FIG. 6 is a diagram showing a configuration example of a game task;

FIG. 10 is a diagram showing a configuration example of a game task;

DETAILED DESCRIPTION

First Embodiment

Embodiments of the present application will be explained. For ease of understanding, embodiments that use an information processing device for games to realize the objectives of the present application will be explained. However, the embodiments described below are provided to give explanations, not to limit the scope of the present application. Therefore, those skilled in the art can adopt embodiments in which some or all of the structural elements are replaced with respective equivalents, and it should be understood that such embodiments are also to be included within the scope of the present application.

Figure 1:
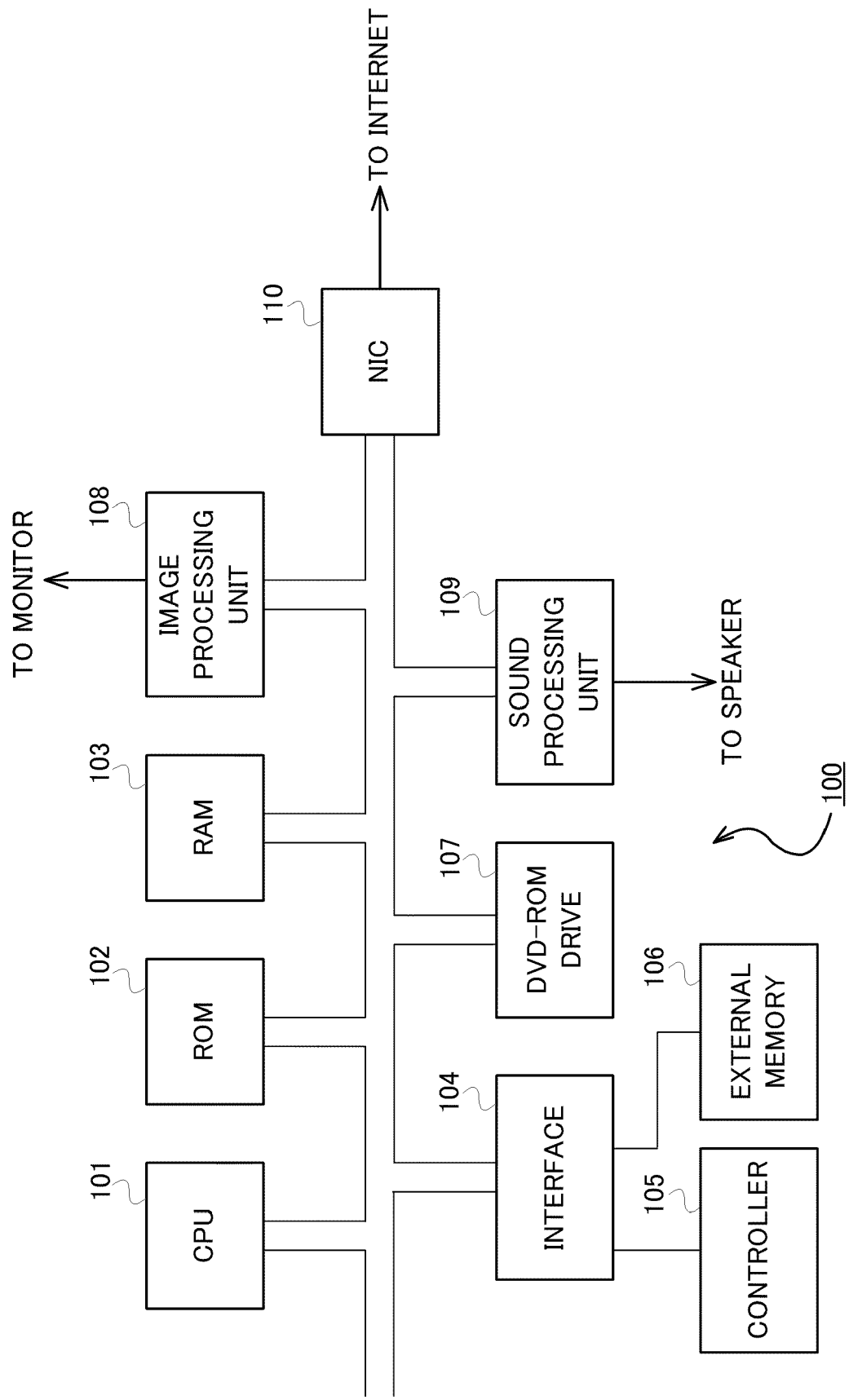
FIG. 1 is a diagram showing a general configuration of a typical information processing device which realizes a gaming device of the present application.

FIG. 1 is an exemplary diagram showing a general configuration of a typical information processing device 100 that functions as a gaming device of the present application by running a program. The explanation will be given with reference to this diagram.

The information processing device 100 includes a CPU (Central Processing Unit) 101, a ROM (Read Only Memory) 102, a RAM (Random Access Memory) 103, an interface 104, a controller 105, an external memory 106, a DVD-ROM (Digital Versatile Disc-Read Only Memory) drive 107, an image processing unit 108, a sound processing unit 109, and an NIC (Network Interface Card) 110.

First, a player may load a DVD-ROM that stores a game program and data in the DVD-ROM drive 107. As the information processing device 100 is turned on, the program is preferably run and a gaming device of the present embodiment is realized.

The CPU 101 controls the entire operation of the information processing device 100, and is connected to each structural element to exchange control signals and data therewith. The CPU 101 includes a register (not shown). The register is a memory area which allows a high-speed access thereto. The CPU 101 can perform various arithmetic operations to the register using an ALU (Arithmetic Logic Unit) (not shown). Such various arithmetic operations may be numerical operations, such as addition, subtraction, multiplication, and division, logical operations, such as logical addition, logical multiplication, and logical negation, and bit operations, such as bitwise OR, bitwise AND, bit inversion, bit shift, and bit rotation. Furthermore, the CPU 101 may by itself be configured to be able to perform saturate calculations, such as addition, subtraction, multiplication, and division, vector operations, trigonometric functions and the like, to execute multimedia processing. The CPU 101 may realize these high-speed operations with a coprocessor.

The ROM 102 preferably stores an IPL (Initial Program Loader) which is executed immediately after the power is turned on. As the IPL is executed, a program stored in the DVD-ROM is preferably read into the RAM 103. Next, the CPU 101 starts running the program. Further, the ROM 102 preferably stores an operating system program and various data that are necessary for controlling the operation of the whole information processing device 100.

The RAM 103 is a temporary memory for storing data and programs. The RAM 103 preferably retains the programs and the data read out from the DVD-ROM. Additionally, the RAM 103 preferably retains the data necessary for game advancement and chat communications. The CPU 101 may have a variable area in the RAM 103. The CPU 101 may perform operations by directly working the ALU on the value stored as the variable. The CPU 101 may once store the value stored in the RAM 103 in the register to perform calculations thereon, and may write back the calculation result in the RAM 103.

The controller 105 connected via the interface 104 in an operable manner preferably receives an operation input given by the player for playing a game, such as a dancing game or a soccer game. Plural controllers 105 may be connected to the interface 104.

The external memory 106 is detachably connected via the interface 104. The external memory 106 preferably stores data representing a play status of a game (e.g., past scores), data representing a progress status of a game, log (record) data of chat communication in the case of a game over a network. The external memory 106 is preferably rewritable. As needed, the player can record such data in the external memory 106 by giving an instruction input via the controller 105.

A DVD-ROM to be preferably loaded in the DVD-ROM drive 107 preferably records a program for attaining a game and image data and sound data accompanying the game. Under the control of the CPU 101, the DVD-ROM drive 107 preferably performs a read-out process on the DVD-ROM loaded therein. The CPU 101 reads out a necessary program and data from the DVD-ROM. The read-out program and data are preferably temporarily stored on the RAM 103 or the like.

The image processing unit 108 preferably processes data read out from the DVD-ROM by means of the CPU 101 and an image computation processor (not illustrated) possessed by the image processing unit. Next, the image processing unit 108 preferably records the processed data in a frame memory (not illustrated). The image processing unit 108 preferably converts image information recorded in the frame memory into video signals at predetermined synchronization timings. Thereafter, the image processing unit 108 preferably outputs the video signals to a monitor (not illustrated) connected thereto. This enables various types of image display.

The image computation processor can perform, at a high speed, overlay calculation of two-dimensional images, transparency calculation like α blending, and various saturation calculations.

A polygon can be arranged in a virtual three-dimensional space. Texture information is affixed to the information of the polygon. The polygon information is subjected to rendering by Z buffering, and therefore executing a calculation of obtaining a rendered image at a high-speed is enabled. Note that a rendered image can be acquired by looking down a polygon arranged in a virtual three-dimensional space from a predetermined view position.

The image computation processor can further depict a letter string together with the CPU 101 in accordance with font information. The font information preferably defines the shape of a letter. The letter string may be depicted in the frame memory as a two-dimensional image, or may be depicted on each polygon surface.

Furthermore, information on images of a game may be recorded in the DVD-ROM. As such information is extracted in the frame memory, the atmosphere or the like of the game can be displayed on a screen.

The sound processing unit 109 first preferably converts sound data read out from the DVD-ROM into an analog signal. Next, the sound processing unit 109 preferably causes a speaker connected thereto to output a sound. Under the control of the CPU 101, the sound processing unit 109 may create data on sound effects or music to be output during the progress of the game. The sound processing unit 109 causes the speaker to output sound associated with created data on the sound effects or music.

When sound data recorded in the DVD-ROM is MIDI data, the sound processing unit 109 preferably reads out sound source data to convert the MIDI data into PCM data. When the sound data is compressed sound data in an ADPCM (Adaptive Differential Pulse Code Modulation) form, an Ogg Vorbis form, or the like, the sound processing unit 109 preferably extracts the compressed sound data and converts it into PCM data. The sound processing unit 109 preferably performs D/A (Digital/Analog) conversion on the PCM data at timings in accordance with the sampling frequency of that compressed sound data and preferably outputs it to the speaker. Accordingly, a sound is output.

The NIC 110 preferably connects the information processing device 100 to a computer communication network (not illustrated) like the Internet. The NIC 110 is preferably an interface that intermediates an Internet-connecting device (not illustrated) and the CPU 101. Such Internet-connection device may be a 10 BASE-T/100 BASE-T compatible product used for establishing a LAN (Local Area Network), an analog modem, an ISDN (Integrated Services Digital Network) modem, or an ADSL (Asymmetric Digital Subscriber Line) modem for connecting to the Internet via a telephone line, or a cable modem or the like for connecting to the Internet via a cable television line.

Furthermore, the information processing device 100 may have a large-capacity external memory device which functions as the ROM 102, the RAM 103, a DVD-ROM loaded in the DVD-ROM drive 107, and the like. Such large-capacity external memory device may be a hard disk drive or the like.

Next, an explanation will be given of a functional configuration of a gaming device 200 of the embodiment attained by the information processing device 100 having the foregoing configuration.

Figure 2:
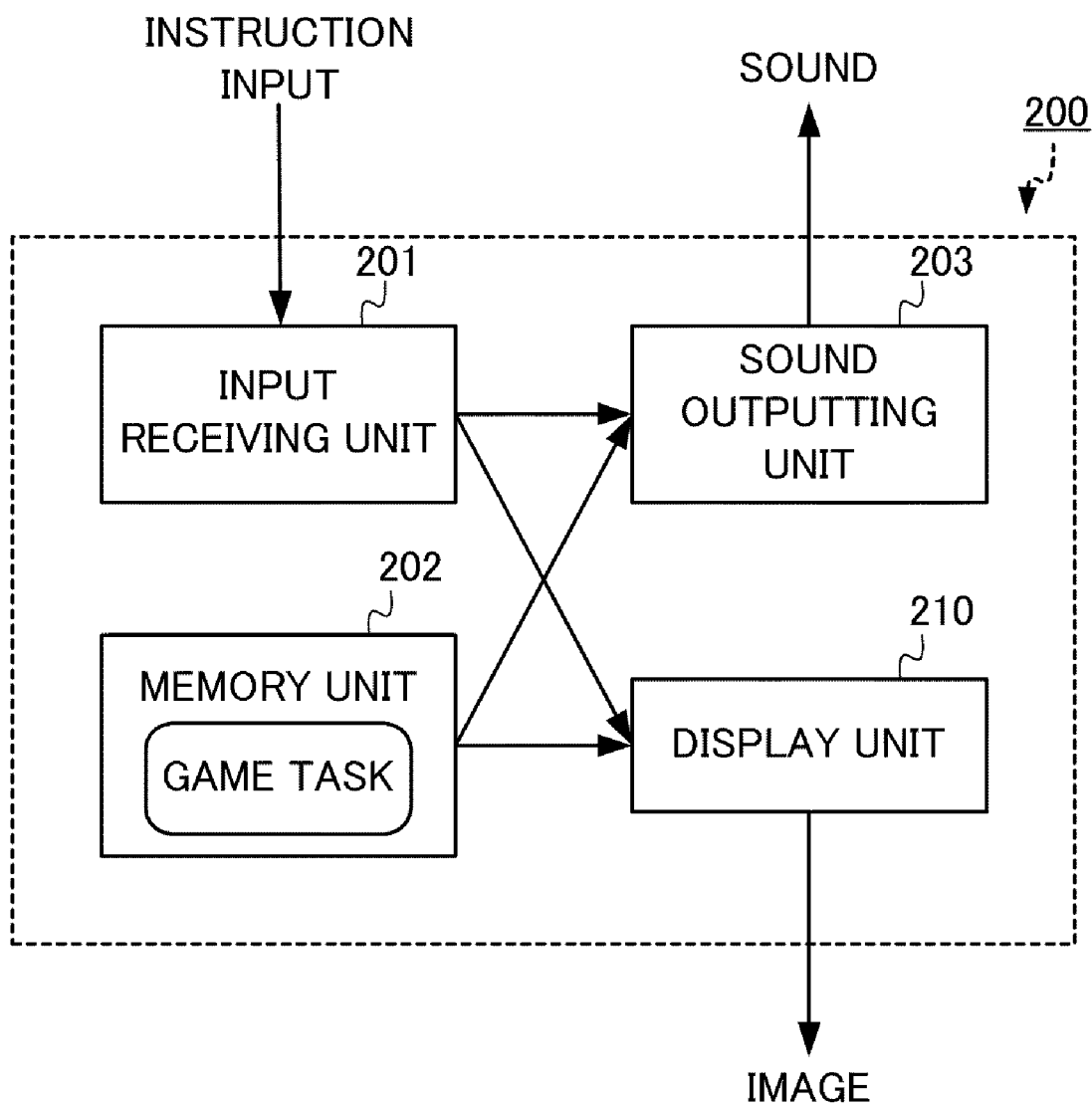
FIG. 2 is a diagram showing a functional configuration of the gaming device.

FIG. 2 is a diagram showing a functional configuration of a gaming device 200 of the embodiment. The gaming device 200 may include an input receiving unit 201, a memory unit 202, a sound outputting unit 203, and a display unit 210.

Figure 3:
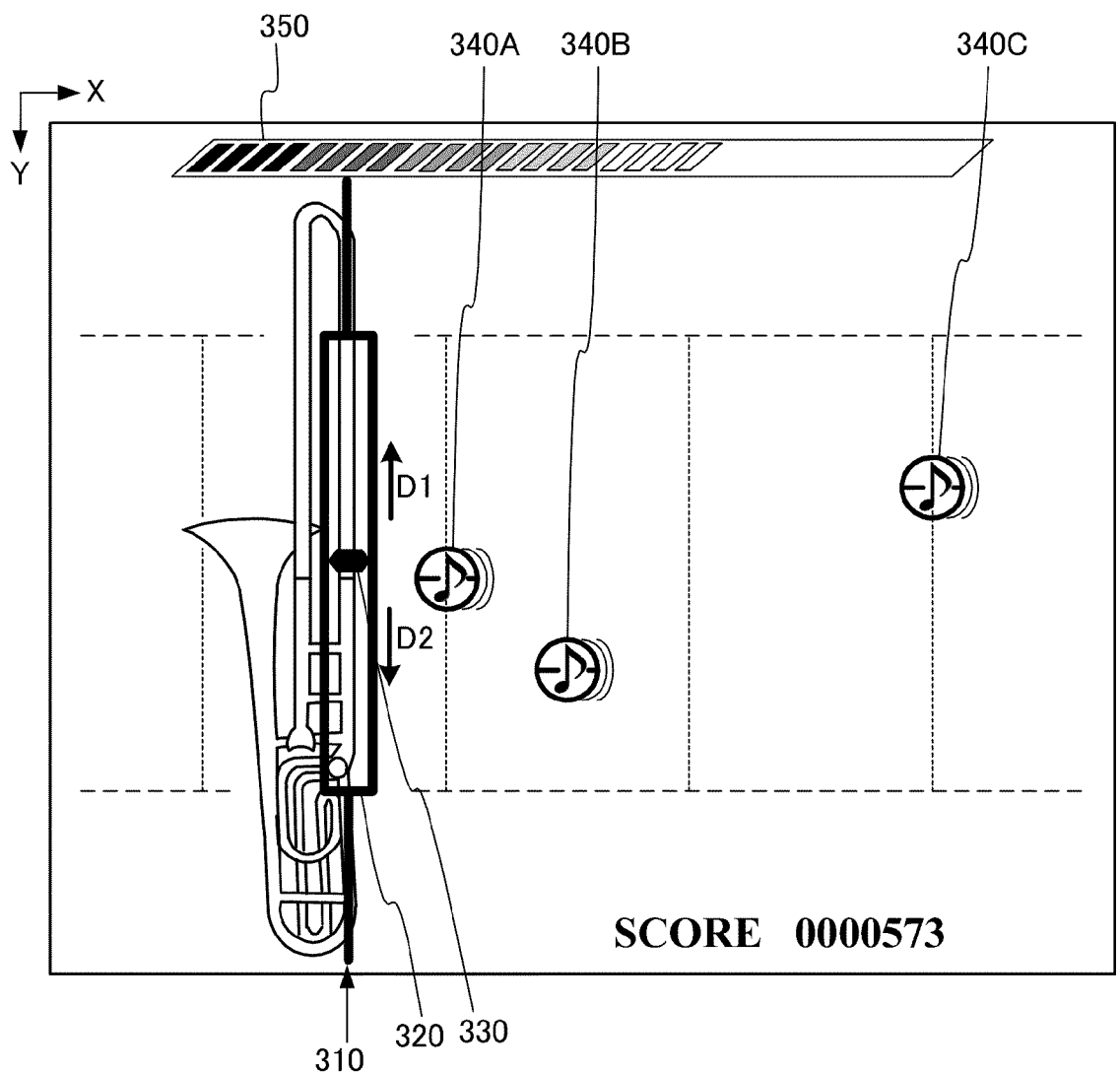
FIG. 3 is a diagram showing an example configuration of a game screen.

FIG. 3 is a diagram showing an illustrative configuration of a game screen by the gaming device 200. In the game screen, a determination line 310, a moving box 320, a moving object 320, musical performance instruction marks 340 (340A to 340C in FIG. 3), a gauge 350, and the like are displayed.

Figure 4:
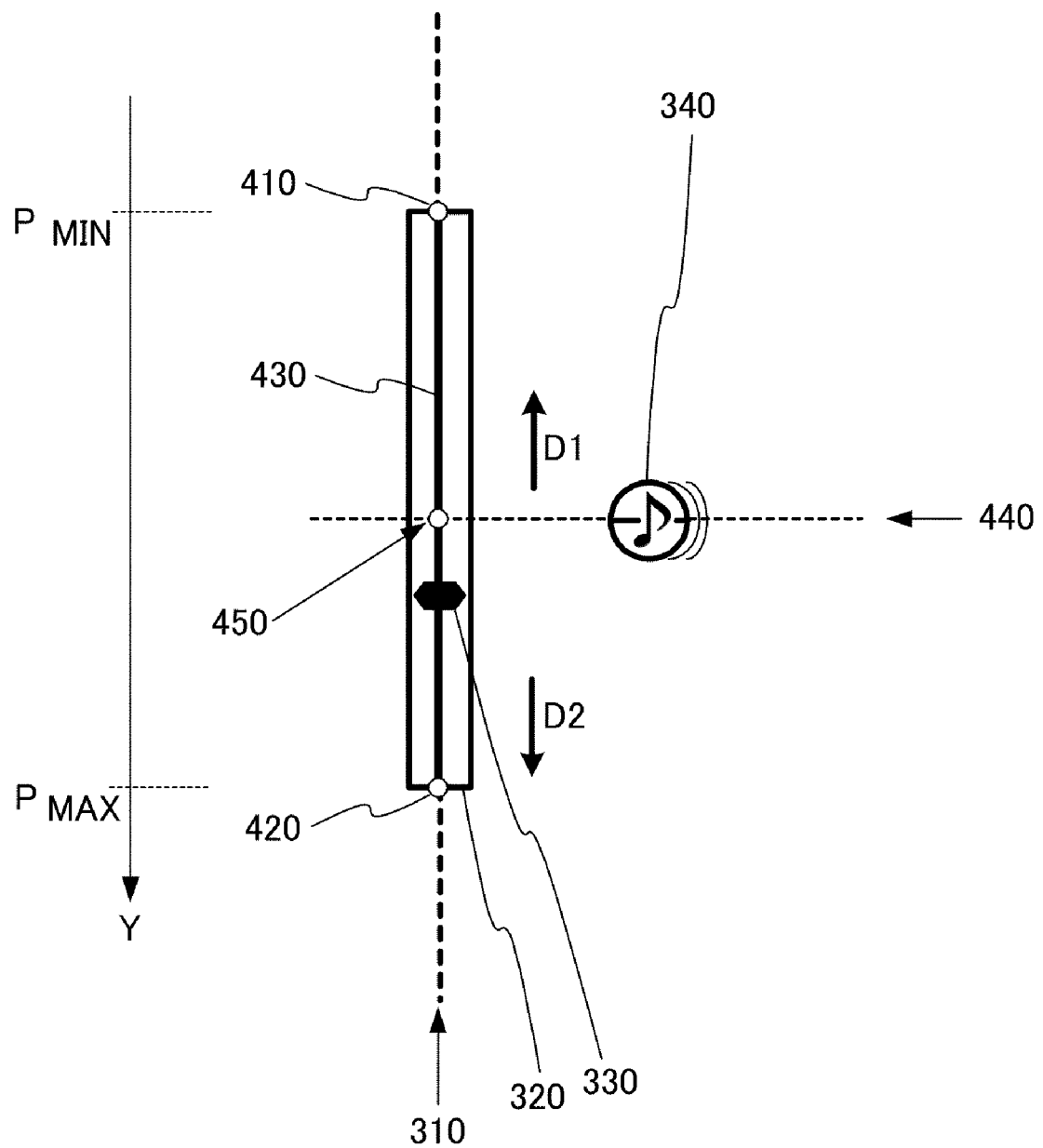
FIG. 4 is a diagram showing a part of the game screen enlarged.

FIG. 4 is an enlarged diagram showing the proximity of the determination line 310 in order to facilitate understanding with the background and the like of the game screen shown in FIG. 3 being eliminated.

What follows is a brief explanation of a game executed by the gaming device 200. The player plays a particular musical instrument in a simulated manner in this game. Then, a music task is reproduced completely. As the game starts, a background sound (or a background music) excluding a particular music instrument (e.g., a trombone) is output from the speaker. The player plays the musical instrument excluded from the background sound in a simulated manner. As a result, the music is played by all musical instruments.

The moving box 320 is preferably fixed at a predetermined position in the game screen. In the present embodiment, there is preferably only one moving object 330 in the game screen. The moving object 330 can move in the moving box 320 along the determination line 310. The moving object 330 preferably moves in a direction of an arrow D1 or an arrow D2 over a pathway 430 in accordance with an instruction from the player. The pathway 430 is preferably a line interconnecting a first end point 410 and a second end point 420 both on the determination line 310. When moving the moving object 330, the CPU 101 may move an image of slide of a trombone drawn over the background together with the moving object 330.

The game screen is preferably displayed on the surface of the display device. A touch panel may be provided on the display device. The touch panel preferably has a sensor that can detect a position where a pen or a finger touches. Such a display device is a so-called "touch screen". The player can move the moving object 330 while contacting a touch pen thereto. In general, this operation is called a "drag". The moving object 330 preferably smoothly moves from a moving start position to a moving end position in response to an instruction from the player.

Figure 5A:
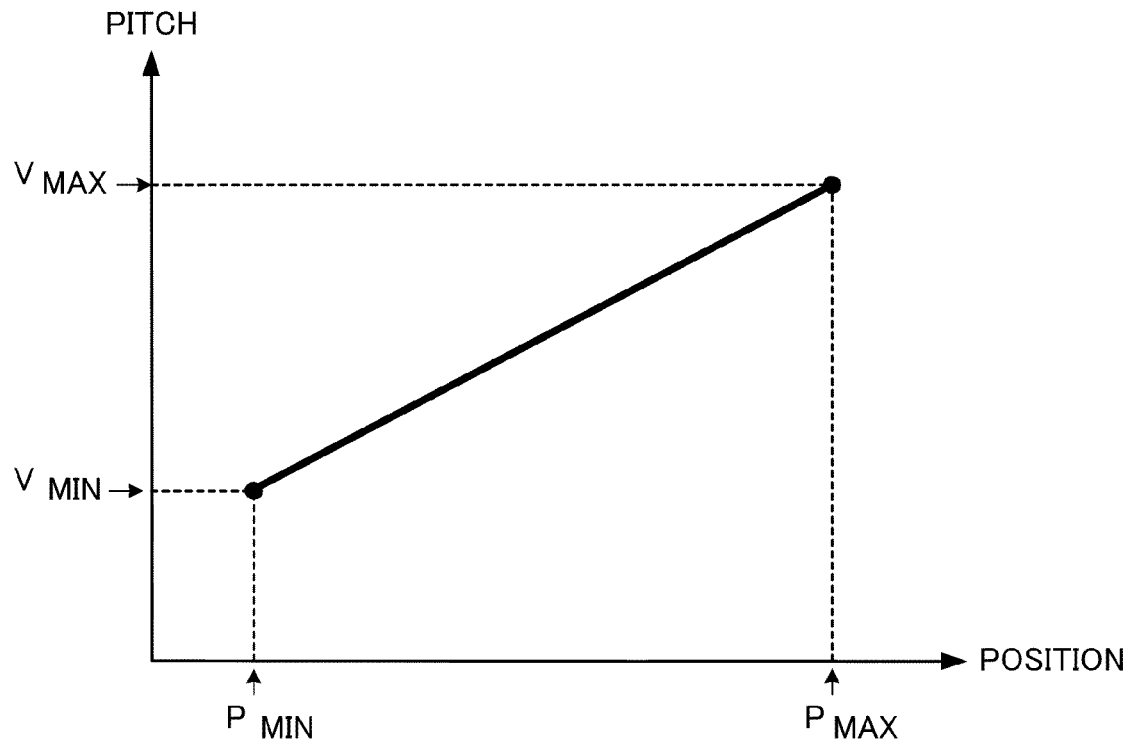
FIG. 5A is a diagram showing an example association between a position on a pathway and a pitch of a sound (when successively change)
Figure 5B:
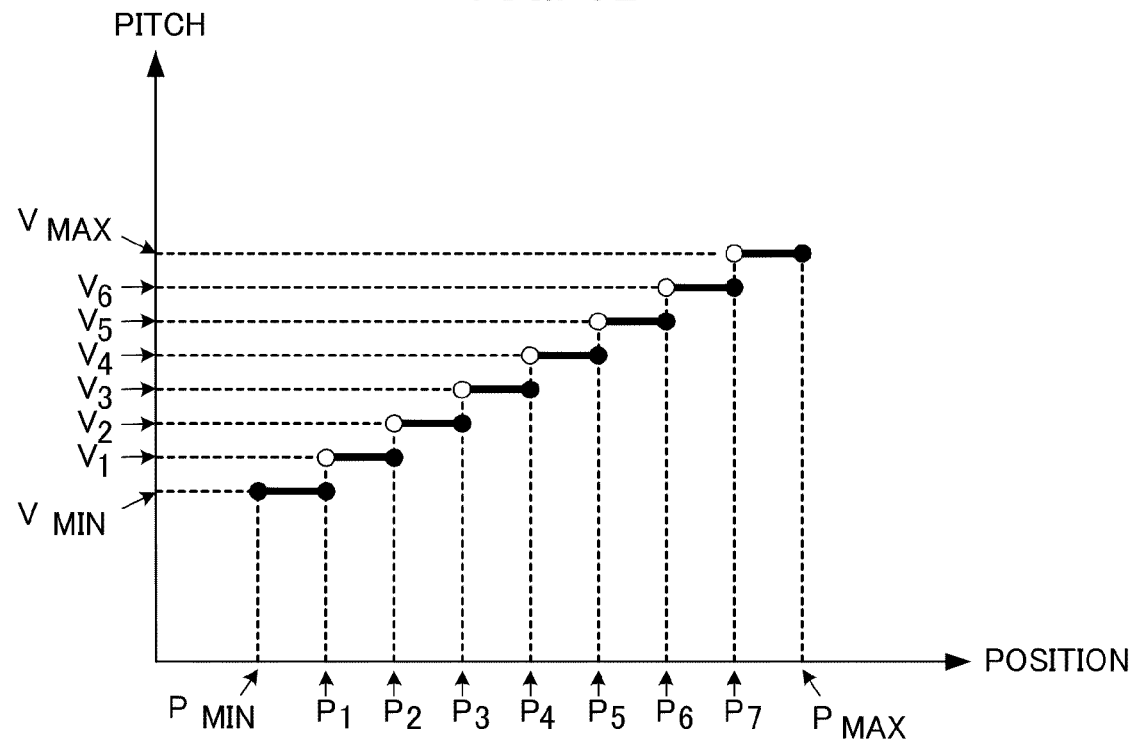
FIG. 5B is a diagram showing an example association between a position on a pathway and a pitch of a sound (when discretely change)

Sounds with predetermined pitches (musical scales or frequencies) are preferably associated with respective positions on the pathway 430. FIGS. 5A and 5B are diagrams showing an illustrative association between a position on the pathway 430 and a pitch (musical scale or frequency).

In FIG. 5A, the horizontal axis represents a coordinate of the position of the moving object 330. The vertical axis represents a pitch. The moving object 330 can move within a range from $P_{MIN}$ to $P_{MAX}$. Moreover, the pitch associated with respective positions preferably successively change from $V_{MIN}$ to $V_{MAX}$. The longer a distance from the first end point 410 to the moving object 330, the higher the associated pitch becomes.

A preferred correspondence relation between a position of the moving object 330 and a pitch in FIG. 5B is as follow.

| | |
|---|---|
| Higher than or equal to $P_{MIN}$ and lower than $P_1$: | $V_{MIN}$ (e.g., a pitch of "do") |
| Higher than or equal to $P_1$ and lower than $P_2$: | $V_1$ (e.g., a pitch of "re") |
| Higher than or equal to $P_2$ and lower than $P_3$: | $V_2$ (e.g., a pitch of "mi") |
| Higher than or equal to $P_3$ and lower than $P_4$: | $V_3$ (e.g., a pitch of "fa") |
| Higher than or equal to $P_4$ and lower than $P_5$: | $V_4$ (e.g., a pitch of "so") |
| Higher than or equal to $P_5$ and lower than $P_6$: | $V_5$ (e.g., a pitch of "la") |
| Higher than or equal to $P_6$ and lower than $P_7$: | $V_6$ (e.g., a pitch of "si") |
| Higher than or equal to $P_7$ and lower than $P_{MAX}$: | $V_{MAX}$ (e.g., a pitch of "do" one octave higher) |

In the present embodiment, the first end point 410 is preferably associated with the lowest sound of a trombone. The second end point 420 is preferably associated with the highest sound of the trombone. In other words, in FIG. 3, as the player moves the moving object 330 to the upper part of the game screen (a direction in which a Y-coordinate becomes small), a low sound is preferably emanated. Conversely, as the player moves the moving object 330 to the lower part of the game screen (a direction in which the Y-coordinate becomes large), a high sound is preferably emanated.

However, the correspondence relation between each position on the pathway 430 and a sound is optional, and is not limited to the embodiment of the present application. For example, in FIG. 5A, the change rate of a high sound is constant. However, the change rate of a high sound may be not constant. That is, the change amount of a pitch may be non-proportional to the change amount of a position.

The CPU 101 preferably moves a musical performance instruction mark 340 along with playing of music. The musical performance instruction mark 340 preferably moves toward the determination line 310. In FIG. 4, the musical performance instruction mark 340 preferably moves from right to left over an orbit 440. The musical performance instruction mark 340 is also called a "musical note". When passing through the determination line 310, the musical performance instruction mark 340 preferably moves further to the left of the screen. Thereafter, a distance between the musical performance instruction mark 340 and the determination line 310 preferably becomes large, and the musical performance instruction mark 340 preferably disappears from the screen.

The player may input an instruction in order to play a trombone in a simulated manner using the controller 105. This instruction is preferably given by moving the moving object 330 in a direction of the arrow D1 or the arrow D2. The player can move the moving object 330 at an arbitrary position on the pathway 430.

When the musical performance instruction mark 340 moves to a position 450 overlapping the determination line 310, it is necessary for the player to move the moving object 330 to the position 450. In this timing, as the moving object 330 moves to the position 450, a sound associated with the position 450 is preferably emanated. That is, a sound of a trombone that the player plays in a simulated manner is preferably emanated. Then, a sound of the trombone is superimposed on the background sound, so that a musical performance by all musical instruments is preferably emanated.

The musical performance instruction mark 340 preferably notifies the player the timing at which the moving object 330 must be moved and a position where the moving object 330 must be moved at that timing (hereinafter, a "game task"). The player may visually check the musical performance instruction mark 340, thereby determining a position and a time that the moving object 330 must be moved. At least one game task is defined for each music piece. However, it is desirable that plural game tasks should be defined.

A timing that the moving object 330 must be moved is typically indicated as a bar number currently played and a beat in that bar. Alternatively, the timing may be indicated as information indicating how many seconds have elapsed from the beginning of the music played.

The position where the moving object 330 must be moved is preferably specified by a coordinate. A coordinate system used for indicating a coordinate may be a predetermined coordinate system (e.g., an X-Y coordinate) defined in the game screen. How to define the coordinate system is optional.

A condition that the position of the musical performance instruction mark 340 matches the position of the moving object 330 is called that "a game task completes". When one game task completes, the player acquires a predetermined point. The acquired point is added to a score. Moreover, a value of the gauge 350 which indicates the heat of the game increases by a predetermined level.

Next, an explanation will be given of individual units of the gaming device 200.

The input receiving unit 201 preferably receives an instruction input specifying a position where the moving object 330 is arranged. The instruction input is given as, for example, the player depresses an operation button of the controller 105 of the gaming device 200. The CPU 101 and the controller 105 preferably work together to function as the input receiving unit 201.

The memory unit 202 preferably stores a timing associated with a position where the moving object 330 must be moved at that timing as a game task. When there are multiple game tasks, the memory unit 202 preferably stores each timing and each position where the moving object 330 must be moved in association with each other specified by each game task. The CPU 101 and the external memory 106 work together to function as the memory unit 202.

The display unit 210 preferably displays the musical performance instruction mark 340 indicating a timing and a position at which the moving object 330 must be moved, both stored in the memory unit 202. The display unit 210 may move the musical performance instruction mark 340 on the orbit 440 as time elapses.

The CPU 101, the image processing unit 108 and the like preferably work together to function as the display unit 210.

Note that the display unit 210 may be omitted accordingly.

FIG. 6 is a diagram showing an illustrative configuration of a game task stored in the external memory 106. By way of example, assume a total of N (N is an integer greater than or equal to 1) number of game tasks are defined. As shown in FIG. 6, the first illustrative game task (item number=1) is "to move the moving object 330 to a position having coordinates of (X1, Y1) at the first beat of the first bar". The second illustrative game task (item number=2) is "to move the moving object 330 to a position having coordinates of (X2, Y2) at the third beat of the second bar". The N-th illustrative game task (item number=N) is "to move the moving object 330 to a position having coordinates of (XN, YN) at an m-th beat of an n-th bar".

When there are a total of N number (N is an integer greater than or equal to 1) of game tasks, an i-th game task P(i) can be expressed as an [equation 1].

$$P(i)=(T(i),(X(i),Y(i))) \quad \text{[Equation 1]}$$

where:
T(i) is a timing (time) that the moving object 330 must be moved;
X(i) is an X-coordinate of a position where the moving object 330 must be moved; and
Y(i) is a Y-coordinate of the position where the moving object 330 must be moved.

A position may be expressed only by an X-coordinate as expressed in [equation 2]. Alternatively, the position may be expressed only by a Y-coordinate as expressed in [equation 3].

$$P(i)=(T(i),X(i)) \quad \text{[Equation 2]}$$

$$P(i)=(T(i),Y(i)) \quad \text{[Equation 3]}$$

Note that the specific content of a game task is not limited to the embodiment of the present application. That is, a position and a timing specified by a game task can be set arbitrarily. Moreover, the number of game tasks can be set arbitrarily.

The sound outputting unit 203 preferably determines whether, at a timing specified by a game task, a position specified by an instruction input matches a position stored in association with that timing. The instruction input is preferably received from the input receiving unit 201. Typically, the sound outputting unit 203 preferably determines whether a position specified by a latest instruction input matches a position stored in association with a timing specified by a next game task. The latest instruction input means the last instruction input received. When determining that a position specified by the instruction input matches a position stored in association with a timing specified by a game task, the sound outputting unit 203 preferably emanates a sound associated with the position specified by the instruction input. The CPU 101 and the sound processing unit 109 preferably work together to function as the sound outputting unit 203.

Figure 7:
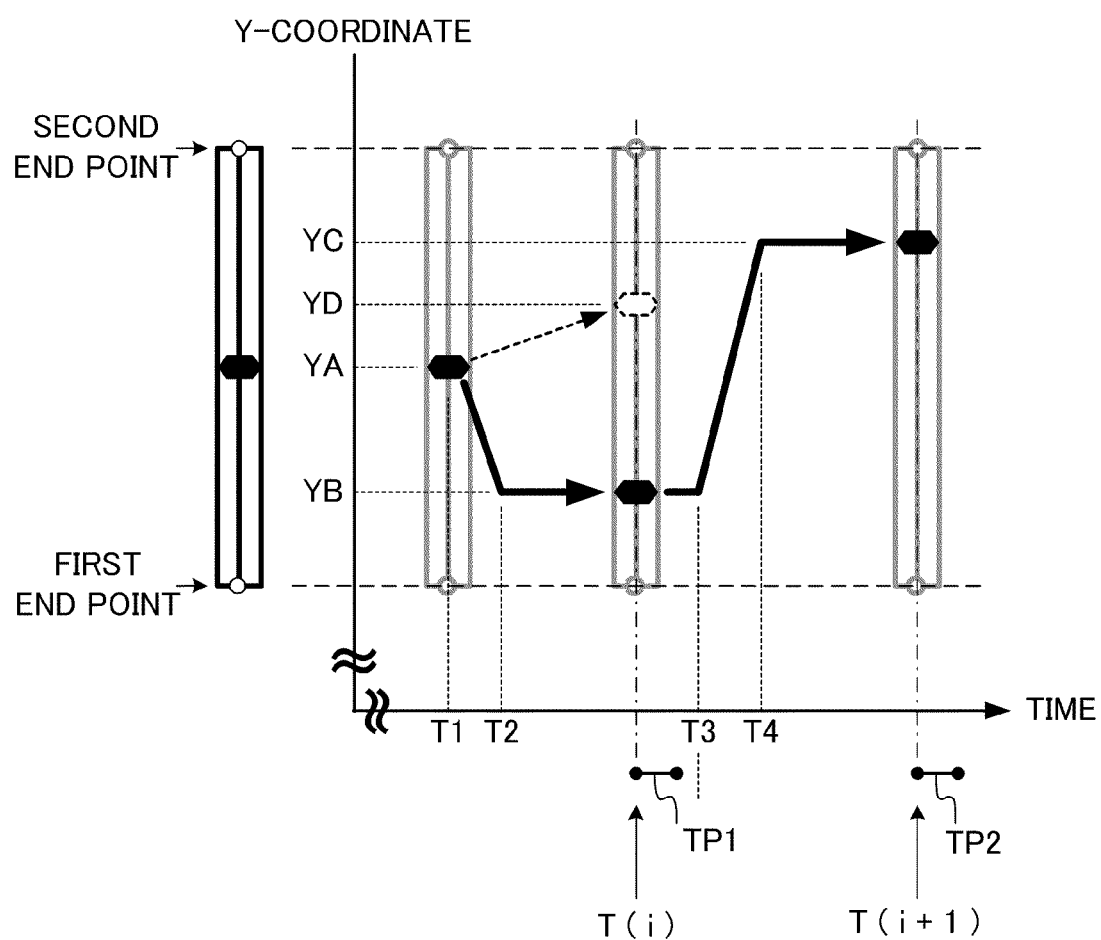
FIG. 7 is a diagram showing an example how a position of a moving object changes together with time.

FIG. 7 is a diagram showing an example how the position (Y-coordinate) of the moving object 330 shown in FIG. 3 changes as time elapses. As explained above, in the present embodiment, the moving object 330 preferably moves in the vertical direction along the determination line 310 fixed in the screen. An explanation will now be given of a process executed by the sound outputting unit 203 with reference to FIG. 7.

At a time T1, the moving object 330 is arranged at a position YA. As shown in FIG. 7, two game tasks P(i), and P(i+1) can be expressed as [equation 4] and [equation 5], respectively. Note that P(i+1) is a game task following P(i).

$$P(i)=(T(i),YB) \quad \text{[Equation 4]}$$

$$P(i+1)=(T(i+1),YC) \quad \text{[Equation 5]}$$

From the time T1 to a time T2, the player may input an instruction to move the moving object 330. The player inputs an instruction by, for example, dragging an image representing the moving object 330 using a touch pen or a finger. The CPU 101 preferably moves the moving object 330 from the position YA to a position YB. During this operation, the CPU 101 outputs only a background sound. That is, the CPU 101 does not output any sound of a musical instrument (trombone) played by the player.

From the time T2 to a time T(i), the player inputs no instruction to move the moving object 330. The CPU 101 preferably causes the moving object 330 to stand still at the position YB. During this operation, the CPU 101 preferably outputs only a background sound. That is, the CPU 101 does not output any sound of the trombone.

At a time T(i), the CPU 101 preferably determines whether a position specified by a latest instruction input matches the position YB specified by the game task P(i). The position specified by the latest instruction input is the position YB at the time T2. In the case of FIG. 6, the position YB specified by the latest instruction input matches the position YB specified by the game task P(i). Accordingly, the CPU 101 emanates a sound of the trombone associated with the position YB at the time T(i) for a predetermined period TP1.

When a position specified by the latest instruction input does not match the position YB specified by the game task P(i), the CPU 101 preferably outputs only a background sound. That is, the CPU 101 does not output a sound of the trombone.

That is, as shown in FIG. 7, when a position specified by the latest instruction input is YD (≠YB), the CPU 101 preferably does not output a sound of the trombone associated with the position YD.

A predetermined period may be common to all game tasks. Alternatively, the predetermined period may differ for each game task. The CPU 101 may change the predetermined period in accordance with a position or a timing specified by a game task.

From the time T(i) to a time T3, the player inputs no instruction to move the moving object 330. The CPU 101 preferably causes the moving object 330 to stand still at the position YB. During this operation, the CPU 101 outputs only a background sound. That is, the CPU 101 does not output any sound of the trombone.

Note that the predetermined period TP1 is preferably shorter than a time from the time T(i) to the time T3, or is the same time length.

From the time T3 to a time T4, the player inputs an instruction to move the moving object 330. The player inputs an instruction by, for example, dragging the image representing the moving object 330 using a touch pen or a finger. The CPU 101 preferably moves the moving object 330 from the position YB to a position YC. During this operation, the CPU 101 outputs only a background sound. That is, the CPU 101 does not output any sound of the trombone.

From the time T4 to a time T(i+1), the player inputs no instruction to move the moving object 330. The CPU 101 preferably causes the moving object 330 to stand still at the position YC. During this operation, the CPU 101 outputs only a background sound. That is, the CPU 101 does not output any sound of the trombone.

At a time T(i+1), the CPU 101 determines whether a position specified by the latest instruction input matches the position YC specified by the game task P(i+1). The position specified by the latest instruction input is preferably the position YC at the time T4. In the case of FIG. 7, the position YC specified by the latest instruction input matches the position YC specified by the game task P(i+1). Accordingly, at the time T(i+1), the CPU 101 preferably outputs a sound of the trombone associated with the position YC for a predetermined period TP2.

Figure 8:
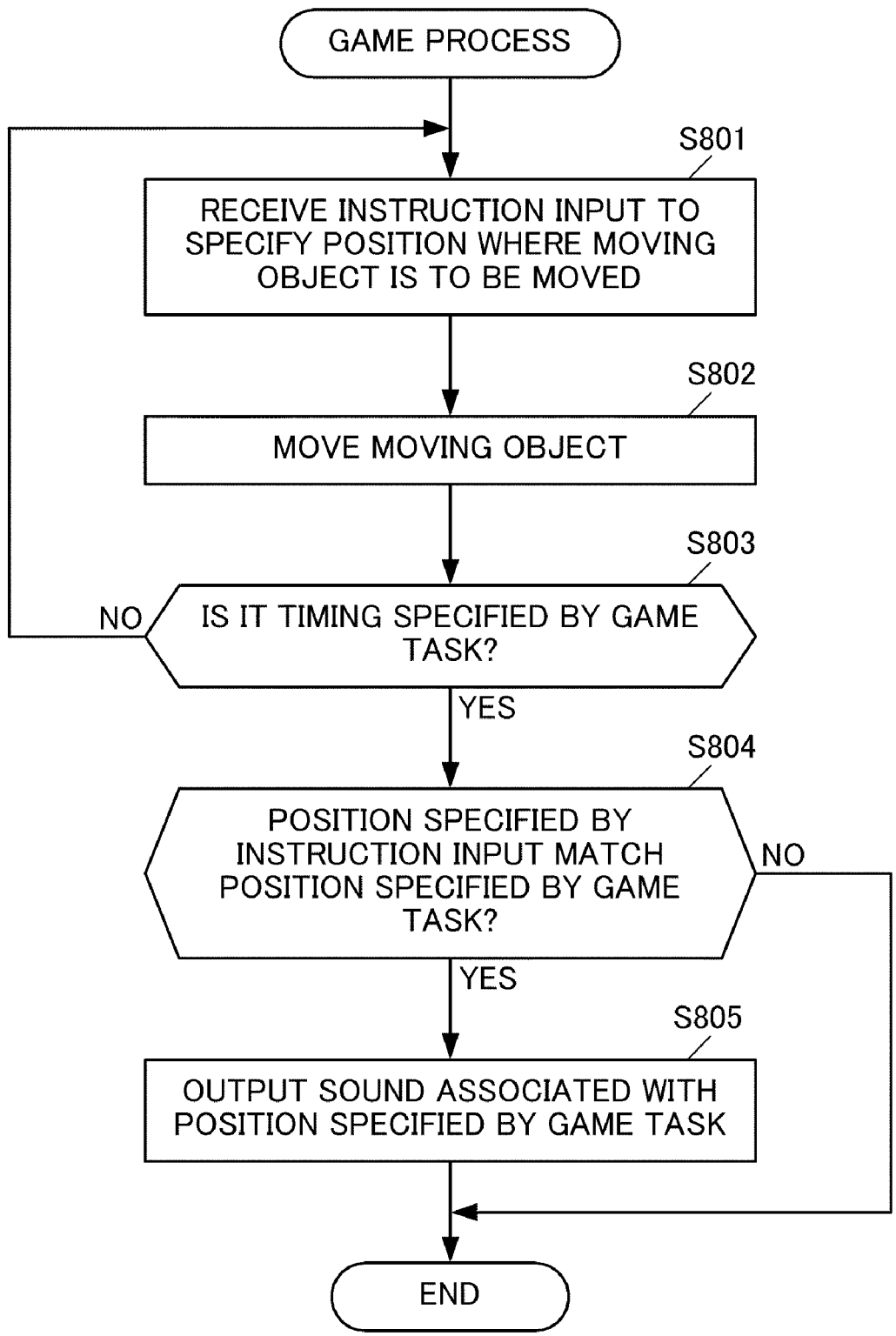
FIG. 8 is a flowchart for explaining a game process.

Next, an explanation will be given of a preferred game process executed by the above-explained individual units of the present embodiment with reference to the flowchart of FIG. 8. A game process shown in FIG. 8 is preferably a process executed per game task. When there are multiple game tasks, a process of each step explained below is repeated by the number of game tasks. The CPU 101 preferably counts an elapsed time from the start of the game (start of playing a background sound).

First, the CPU 101 preferably receives an instruction input of specifying a position (e.g., an destination point of dragging) where the moving object 330 is to be moved (step S801). For example, the player drags the image representing the moving object 330 using a touch pen or a finger, thereby inputting an instruction to specify a position where the moving object 330 is to be moved. The CPU 101 preferably receives an instruction input from the player.

Based on the instruction input received in the step S801, the CPU 101 preferably moves a position of the moving object 330 in the game screen (step S802).

The CPU 101 preferably determines whether a current time matches the timing specified by a game task (step S803). For example, this determination process is repeated at a predetermined periodical time interval by vertical synchronization (VSYNC).

When the current time is not a timing specified by the game task (step S803: NO), the CPU 101 preferably repeats the processes from the step S801 to the step S802 again.

When the current time is the timing specified by the game task (step S803: YES), the CPU 101 preferably determines whether a position specified by a latest instruction input matches a position specified by a game task (step S804).

The CPU 101 may determine whether a position specified by a latest instruction input matches a position specified by a game task within a predetermined error range.

When the position specified by the latest instruction input matches the position specified by the game task (step S804: YES), the CPU 101 preferably outputs a sound associated with the position specified by the instruction input (step S805). The CPU 101 may output a sound associated with the position specified by the game task for a predetermined period.

When the position specified by the latest instruction input does not match the position specified by the game task (step S804: NO), the CPU 101 preferably terminates the game process. Note that the CPU 101 returns the process to the step S801 and preferably repeats the processes from the step S801 to the step S805 if the following two conditions are satisfied:
(a) there are multiple game tasks; and
(b) there is a game task following a game task determined in the step S803.

According to the present embodiment, the player can enjoy a game of playing a musical instrument in a simulated manner through a simple operation. In the foregoing explanation, an explanation of a music game of playing a trombone was given as an example. However, the present application can be applied to games of playing other musical instruments, such as a sliding whistle, a musical saw, and a violin.

The gaming device 200 may have an input interface which allows a player to change a virtual position of his left hand when playing a string instrument. That is, the operation of the gaming device 200 is not limited to an operation of changing a pitch of a wind instrument. The gaming device 200 can provide an input interface common to various musical instruments without needing an exclusive controller for playing a certain musical instrument.

In the present embodiment, the moving object 330 is moved based on an instruction input as the player touches a touch screen. However, the moving object 330 may be moved based on an instruction input through other schemes. For example, the CPU 101 may move the moving object 330 based on a depressing operation of a predetermined button of the controller 105 or a keyboard. Moreover, the CPU 101 may move the moving object 330 based on an instruction input through a clicking operation of a mouse or a moving operation of a mouse pointer.

Second Embodiment

Next, another embodiment of the present application will be explained. In the foregoing embodiment, a timing and a position in which the moving object 330 must be moved are associated with each other in one game task. In the present embodiment, in addition to a timing and a position, a time length for maintaining the moving object 330 at that position is also associated.

Figure 9:
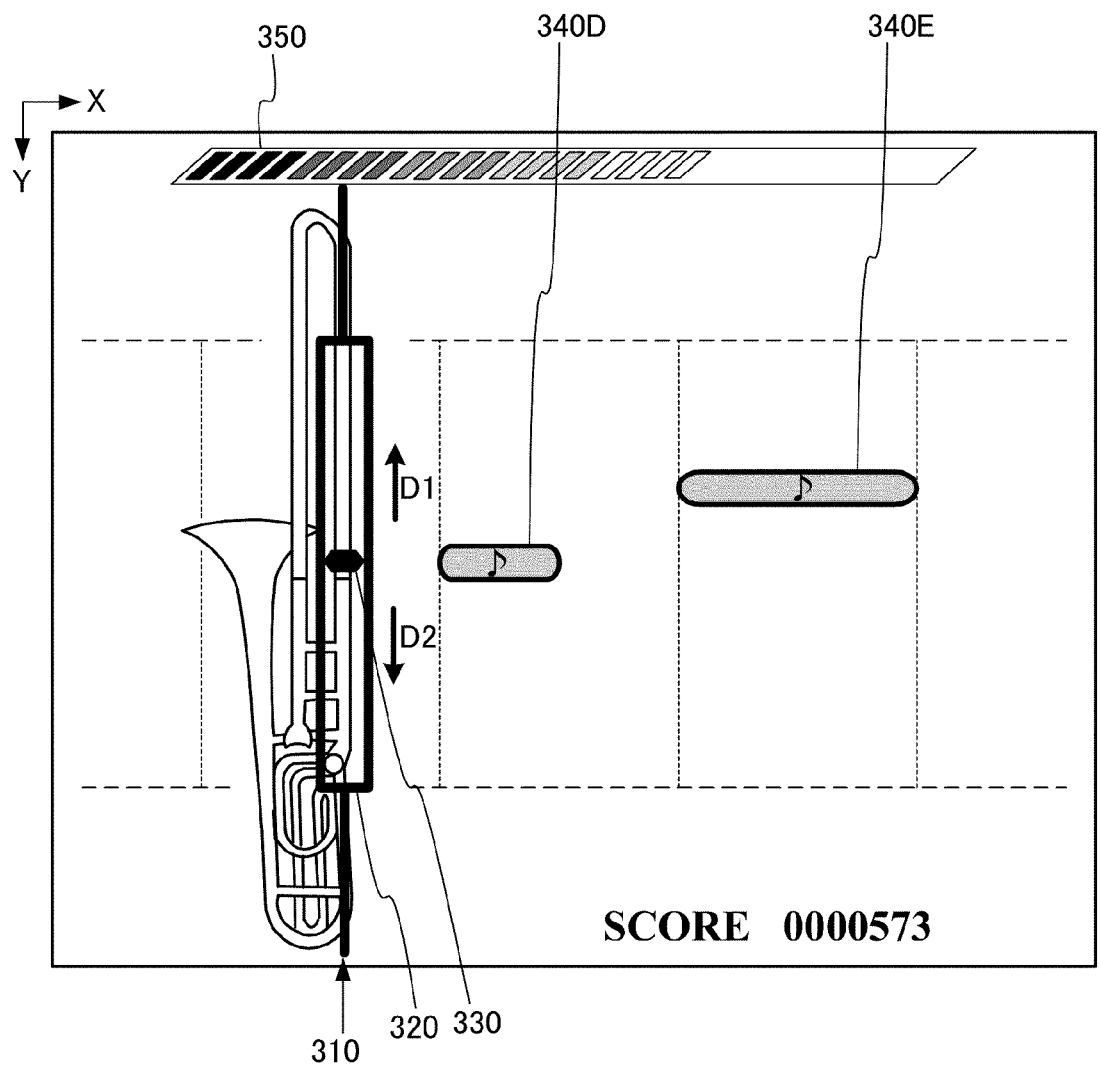
FIG. 9 is a diagram showing a configuration example of a game screen according to a second embodiment.

FIG. 9 is a diagram showing an illustrative configuration of a game screen. The horizontal length of the musical performance instruction marks 340 of the present embodiment (in FIG. 9, two of 340D and 340E) preferably adjusts in accordance with the time length that the moving object 330 is meant to be maintained. In a word, the musical performance instruction mark 340 indicates not only a position of a musical note but also the time length of the musical note.

FIG. 10 is a diagram showing an illustrative configuration of a game task stored in the memory unit 202 according to the present embodiment. In a pair of game tasks, the timing at which the moving object 330 must be moved, the position where the moving object 330 must be moved at that timing, and the time length of maintaining the moving object 330 at that position are associated with each other. In the present embodiment, the time length for maintaining the current position of the moving object 330 corresponds to the time length of the emanating sound of, for example, a trombone with a constant pitch.

An i-th game task P(i) can be expressed as [equation 6].

$$P(i)=(T(i),(X(i),Y(i)),L(i)) \qquad \text{[Equation 6]}$$

L(i) is the time length for maintaining the moving object 330 at a position (X(i), Y(i)). In other words, L(i) is the time length of the emanating sound. The time length set for each game task (i.e., for each musical note) may differ.

Like the timing, a time length may be expressed using a bar number and a beat such that "from an M1-th beat of a bar with a bar number of N1 to an M2-th beat of a bar with a bar number of N2 in a music to be played". Moreover, a time length may be expressed with reference to an actual time like "for X seconds", "by X times of VSYNC".

When a position specified by a latest instruction input matches a position specified by a game task, the sound outputting unit 203 of the present embodiment emanates a sound associated with that position for the time length specified by the game task.

Figure 11:
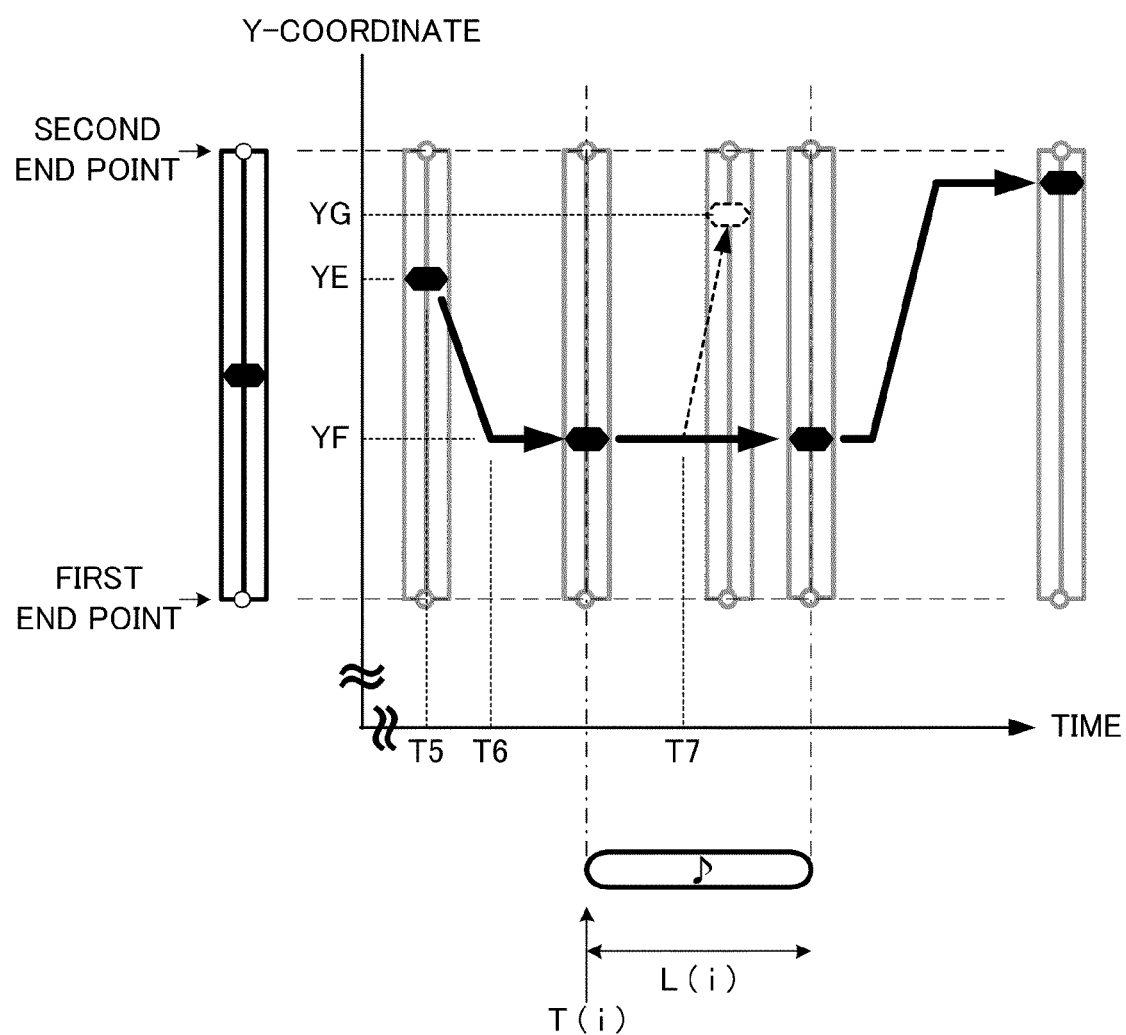
FIG. 11 is a diagram showing an example how a position of a moving object changes together with time.

FIG. 11 is an illustrative diagram demonstrating how a position (Y-coordinate) of the moving object 330 shown in FIG. 9 may change. The moving object 330 preferably moves in the vertical direction along the determination line 310 fixed in the screen. An explanation will now be given of a process executed by the sound outputting unit 203 of the present embodiment.

As shown in FIG. 11, at a time T5, the moving object 330 is arranged at a position YE, and a game task P(i) is expressed as [equation 7].

$$P(i)=(T(i),YF,L(i)) \qquad \text{[Equation 7]}$$

From the time T5 to a time T6, a player inputs an instruction to move the moving object 330. The player inputs an instruction by dragging an image representing the moving object 330 using, for example, a touch pen. The CPU 101 preferably moves the moving object 330 from the position YE to a position YF. During this operation, the CPU 101 preferably outputs only a background sound. That is, the CPU 101 does not output any sound of a musical instrument (trombone) played by the player.

From the time T6 to a time T(i), the player inputs no instruction to move the moving object 330. The CPU 101 preferably halts the moving object 330 at the position YF. During this operation, the CPU 101 preferably outputs only a background sound. That is, the CPU 101 does not output any sound of the trombone.

At the time T(i), the CPU 101 preferably determines whether a position specified by a latest instruction input matches the position YF specified by the game task P(i). The position specified by the latest instruction input is preferably the position YF at the time T6. In the case of FIG. 11, the position YF specified by the latest instruction input matches the position YF specified by the game task P(i). Accordingly, at the time T(i), the CPU 101 preferably starts outputting a sound of the trombone associated with the position YF.

When the position specified by the latest instruction input does not match the position YF specified by the game task P(i), the CPU 101 preferably outputs only a background sound. That is, the CPU 101 does not output any sound of the trombone.

From the time T(i) to a time T(i)+L(i), when the moving object 330 rests at the position YF, the CPU 101 preferably keeps outputting a sound of the trombone associated with the position YF.

Conversely, during an arbitrary time T7 from the time T(i) to the time T(i)+L(i), when the moving object 330 moves to a position YG (≠YF) which is not the position YF, the CPU 101 preferably terminates outputting a sound of the trombone. In this case, a sound of the trombone discontinues after being output for a period shorter than the output time length L(i) specified by the game task P(i).

At the time T(i)+L(i), when a sound of the trombone associated with the position YF is being output, the CPU 101 preferably terminates the sound of the trombone which is being output. That is, in this case, the sound of the trombone is being output for the output time length L(i).

Note that at a time T(i)+L(i), when the sound of the trombone associated with the position YF is not output, the CPU 101 preferably refrains from outputting any sound of the trombone.

Figure 12:
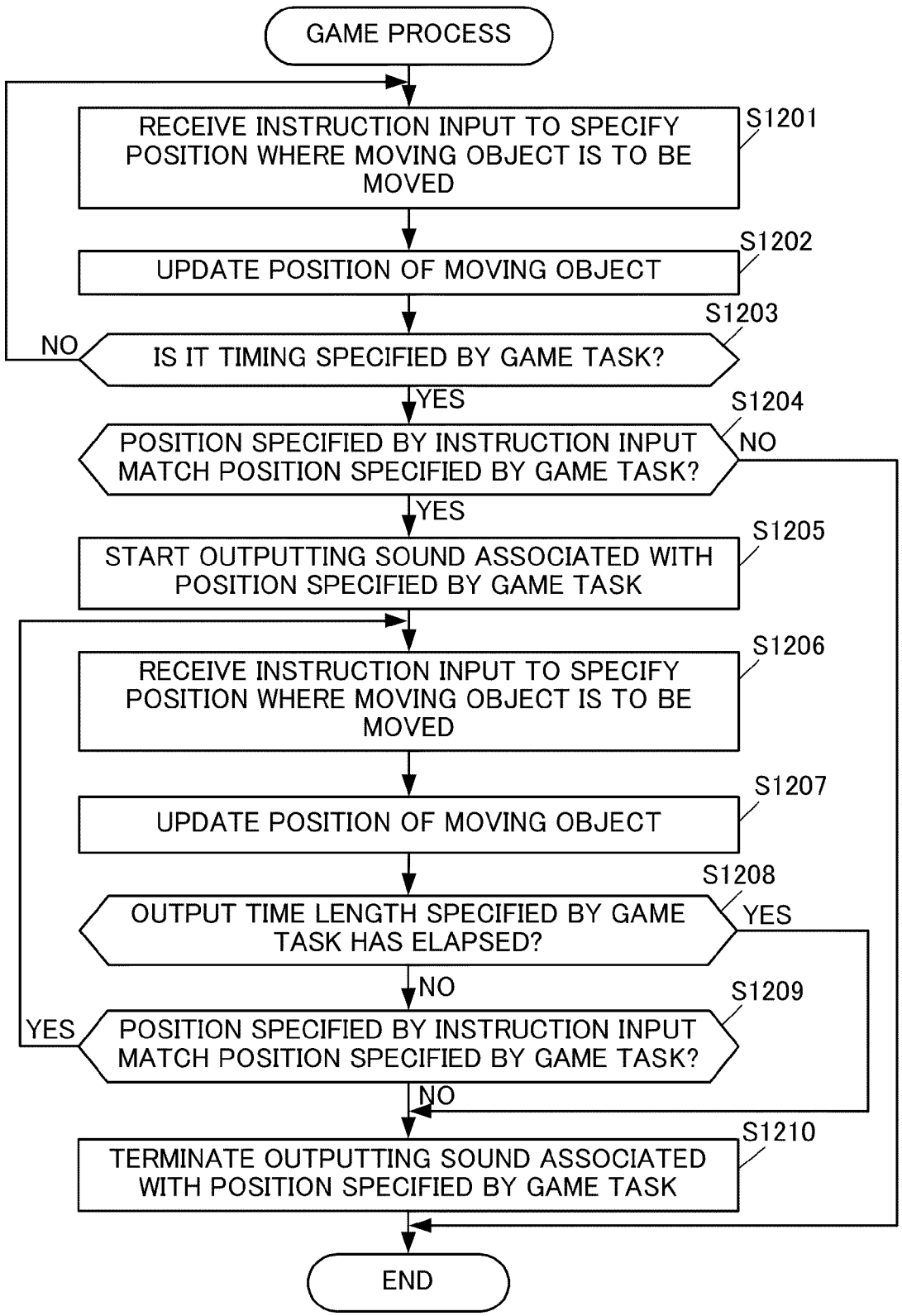
FIG. 12 is a flowchart for explaining a game process.

Next, an explanation will be given of a game process of the embodiment with reference to a flowchart of FIG. 12.

First, the CPU 101 preferably receives an instruction input to specify a position (e.g., an destination point of dragging) where the moving object 330 is to be moved (step S1201).

The CPU 101 preferably updates a position of the moving object 330 based on an instruction input received in the step S1201 (step S1202).

The CPU 101 preferably determines whether a current time is the time specified by a game task (step S1203). For example, this determination process is repeated at a predetermined periodical time interval like vertical synchronization (VSYNC).

When the current time is not the time specified by the game task (step S1203: NO), the CPU 101 preferably executes the processes from the step S1201 to the step S1202 again.

When the current time is the time specified by the game task (step S1203: YES), the CPU 101 preferably determines whether a position specified by a latest instruction input matches a position specified by the game task (step S1204).

When the position specified by the latest instruction input does not match the position specified by the game task (step S1204: NO), the CPU 101 preferably terminates the game process. Note that if following two conditions are satisfied, the CPU 101 preferably returns to the process of the step S1201, and repeats the game process for a following game task:

(a') there are multiple game tasks; and
(b') there is a game task following a game task determined in the step S1203.

Conversely, when the position specified by the latest instruction input matches the position specified by the game task (step S1204: YES), the CPU 101 preferably starts outputting a sound associated with the position specified by the game task (step S1205). For example, the CPU 101 starts outputting a sound of a trombone. The pitch of the sound of the trombone may correspond to the position specified by the game task.

The CPU 101 preferably successively receives an instruction input to specify a position where the moving object 330 is to be moved (step S1206). Next, the CPU 101 preferably updates a position of the moving object 330 in the game screen based on the received instruction input (step S1207).

The CPU 101 determines whether an output time length specified by the game task has elapsed (step S1208). In other words, the CPU 101 determines whether a sound is being continuously output until the time length specified by the game task has elapsed after emanation of the sound is started at the step S1205. For example, the CPU 101 determines whether a sound of the trombone with a specified pitch kept emanating.

When the output time length has elapsed (step S1208: YES), the CPU 101 preferably progresses the process to a step S1210 to be discussed later.

When the output time length has not elapsed yet (step S1208: NO), the CPU 101 determines whether a position specified by a latest instruction input matches a position specified by a game task (step S1209).

When the position specified by the latest instruction input matches the position specified by the game task (step S1209: YES), the CPU 101 preferably returns to the process of the step S1206. Subsequently, the CPU 101 preferably receives an instruction input to specify a moving destination of the moving object 330. The CPU 101 keeps outputting a sound associated with the position specified by the instruction input. That is, while the moving object 330 is being placed at the position specified by the instruction input, a sound of the trombone is continuously emanating. Note that outputting of the sound has been started at the step S1205.

When the position specified by the latest instruction input does not match the position specified by the game task (step S1209: NO), the CPU 101 preferably terminates outputting a sound associated with the position specified by the game task (step S1210). That is, as the moving object 330 separates from the position specified by the game task, the sound of the trombone is preferably terminated. Thereafter, the CPU 101 preferably terminates the game process. Note that outputting of the sound has been preferably started in the step S1205.

When the moving object 330 is preferably moved again to the position specified by the game task within the time length specified by the game task after terminating emanation of the sound at the step S1210, the CPU 101 may start outputting a sound associated with a position specified by the latest instruction input again. In this case, the sound of a trombone is temporarily discontinued, but resumes emanating again.

According to the present embodiment, the player can enjoy the game that allows the player to obtain the feeling of playing a musical instrument through a simple operation. The gaming device 200 may provide an input interface which facilitates an operation of maintaining a pitch of a wind instrument or an operation of maintaining a position of a left hand for a string instrument. The gaming device 200 does not need an exclusive controller for playing a specific musical instrument. Hence, the gaming device 200 can provide an input interface common to various musical instruments.

The present application is not limited to the foregoing embodiments, and can be changed and modified in various forms. Moreover, individual elements of the foregoing embodiments may be mixed and combined together.

In each of the foregoing embodiments, an instruction input of moving the moving object 330 is preferably given through a dragging operation by the player on a touch screen. However, an instruction input may be given through other schemes.

Figure 13:
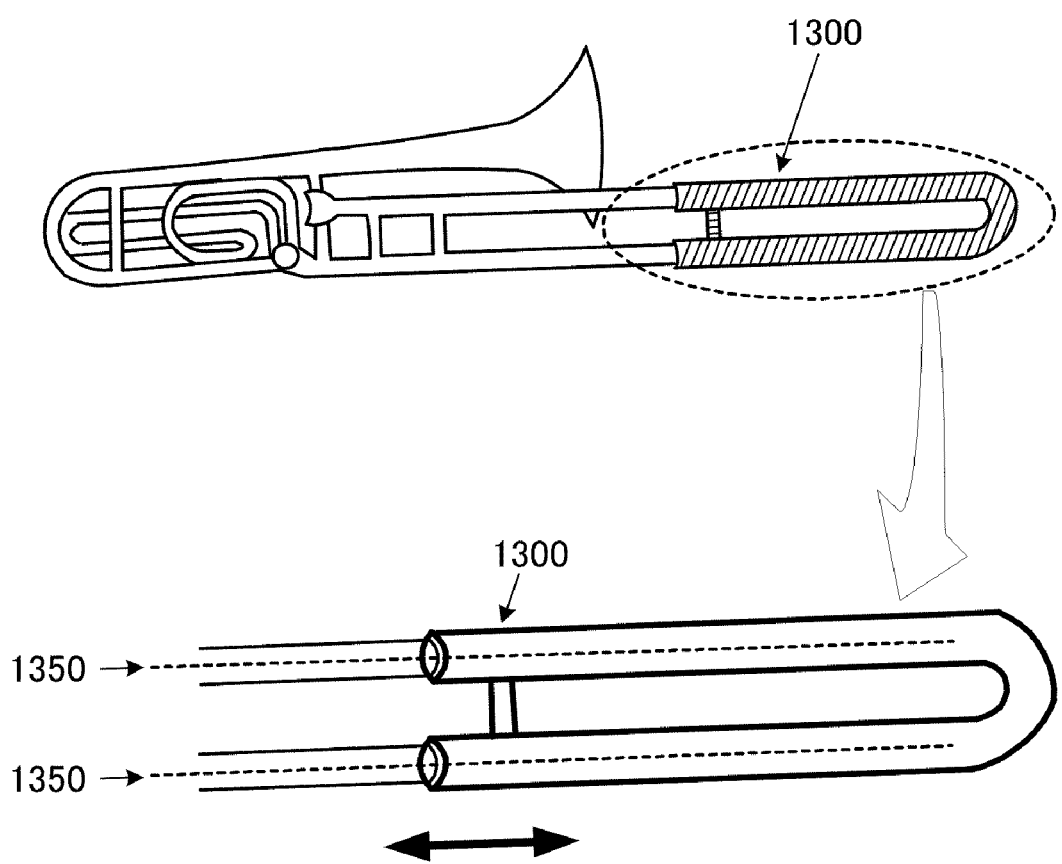
FIG. 13 is a diagram showing an external appearance of a trombone-like controller.

For example, FIG. 13 is a diagram showing an external appearance of an illustrative trombone-like controller. The player may grab a supporting body 1300, and slide it over a pathway 1350. The CPU 101 preferably measures a displacement width of the supporting body 1300. The displacement width may be, for example, a distance from a preset position. The CPU 101 moves the moving object 330 in the game screen shown in FIG. 4 along the pathway 430 based on a measured displacement width. In other words, the supporting body 1300 and the moving object 330 preferably move in unison. Note that the shapes of the parts other than the supporting body 1300 of the trombone-like controller may be changed. This makes it possible to provide an input device for various purposes which enables an operation of not only a trombone but also various musical instruments in a simulated manner.

Figure 14:
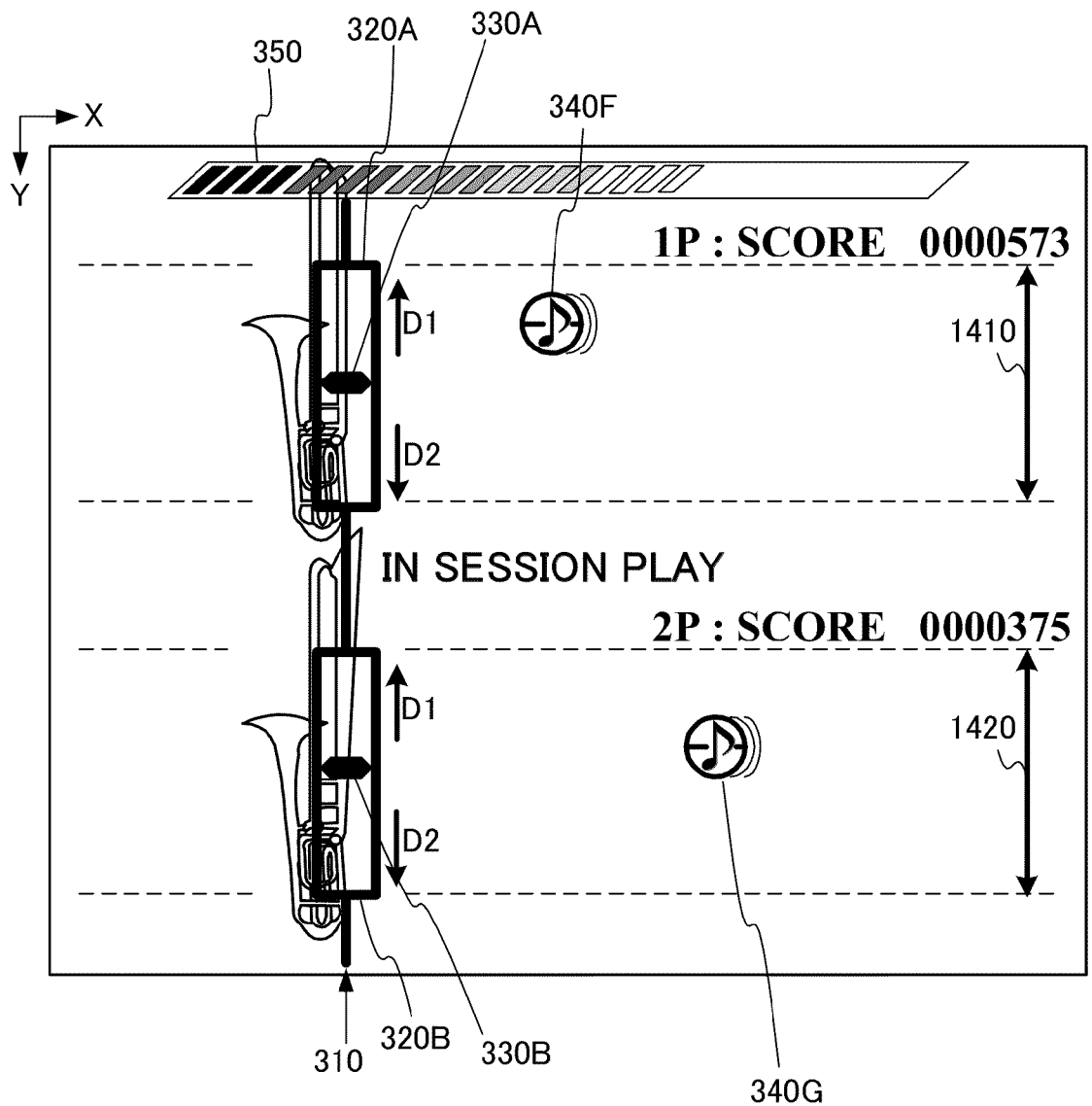
FIG. 14 is a diagram showing another configuration example (two moving objects are arranged on different lanes) of a game screen.

In each of the foregoing embodiments, there is only one moving object 330. However, the number of moving objects 330 may be larger than or equal to two. FIG. 14 shows an illustrative configuration of a game screen where two moving objects 330A, 330B are arranged. For example, assume the game of the embodiments allows two players to play simultaneously. The moving object 330A at the upper part of the screen is a moving object that one (1P side) player must operate. The moving object 330B at the lower part of the screen is a moving object that another (2P side) player must operate.

A musical performance instruction mark 340F is preferably positioned on a lane 1410 for the 1P side. The player of the 1P side inputs an instruction to move the moving object 330A so as to accomplish a game task indicated by the musical performance instruction mark 340F. Conversely, a musical performance instruction mark 340G is preferably positioned on a lane 1420 for the 2P side. The player of the 2P side preferably inputs an instruction to move the moving object 330B so as to accomplish a game task indicated by the musical performance instruction mark 340G.

The game of the embodiments may be a game for playing different musical instruments simultaneously in a simulated manner. For example, the player at the 1P side may input an instruction of playing a trombone. At the same time, the player at the 2P side may input an instruction of playing a violin. Moreover, the game of the embodiments may be a game that allows multiple moving objects 330 to be operated by a single player.

Figure 15:
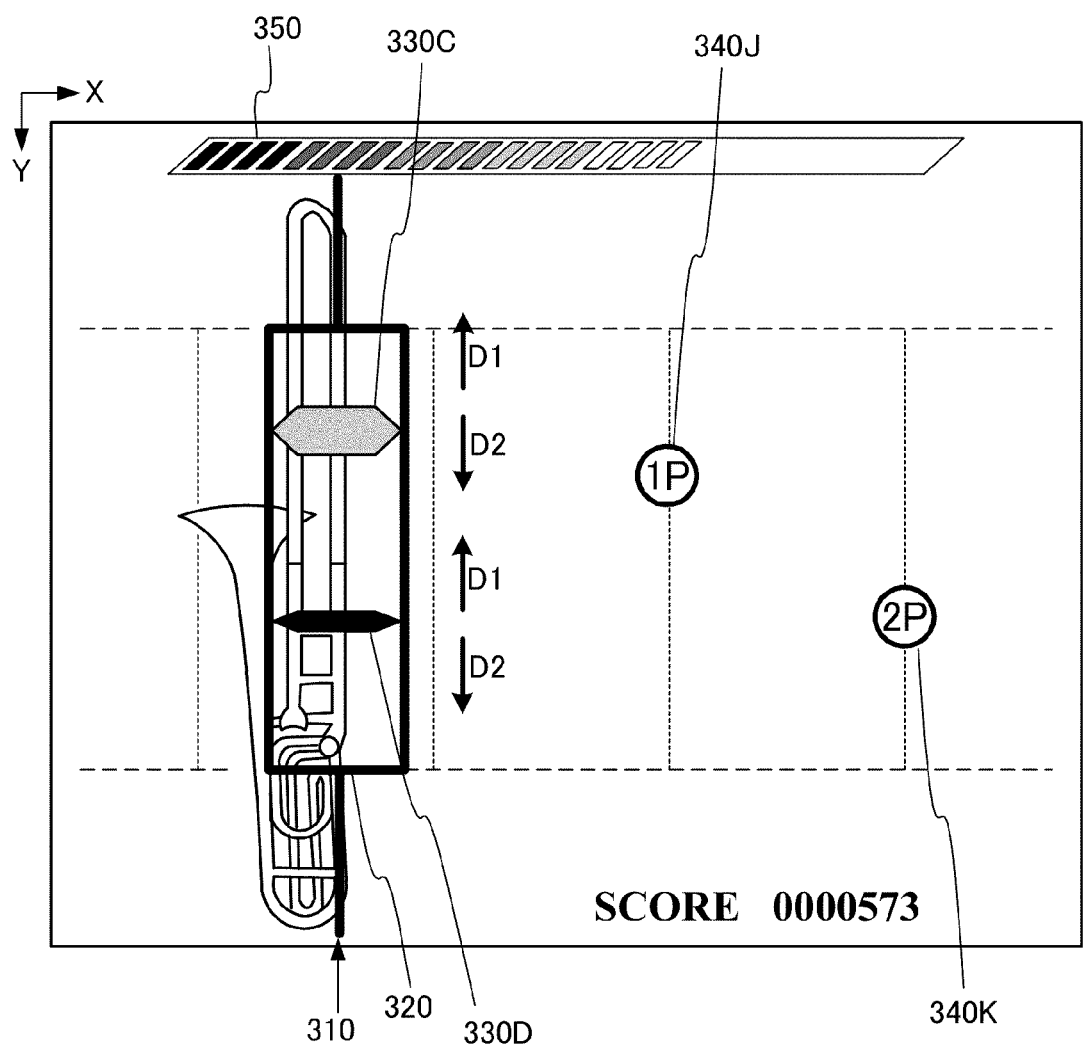
FIG. 15 is a diagram showing the other configuration example (two moving objects are arranged within a moving box) of a game screen.

There may be multiple moving objects 330 along the determination line 310. FIG. 15 shows an illustrative configuration of a game screen having two moving objects 330C, 330D arranged in one moving box 320. For example, in a single player game allowing the single player to play two musical instruments simultaneously, one moving object 330C may be a moving object that the player must operate in order to play a first trombone. Another moving object 330D may be a moving object that the player must operate in order to play a second trombone.

A game task is preferably indicated by a musical performance instruction mark 340J associated with the first trombone and a musical performance instruction mark 340K associated with the second trombone. The player preferably inputs instructions to move the moving objects 340J, 340K in order to accomplish the game task.

Note that when multiple moving objects 330 are arranged on the same determination line 310, it is desirable that individual moving objects 330 have different sizes, shapes, designs, and the like.

For example, as shown in FIG. 15, one moving object 330C is shown as being larger than another moving object 330D. Accordingly, it can be seen that the moving object 330D is always overlapping with the moving object 330C. Therefore, it is not possible for the moving object 330D to be hidden by the moving object 330C and become invisible.

Figure 16:
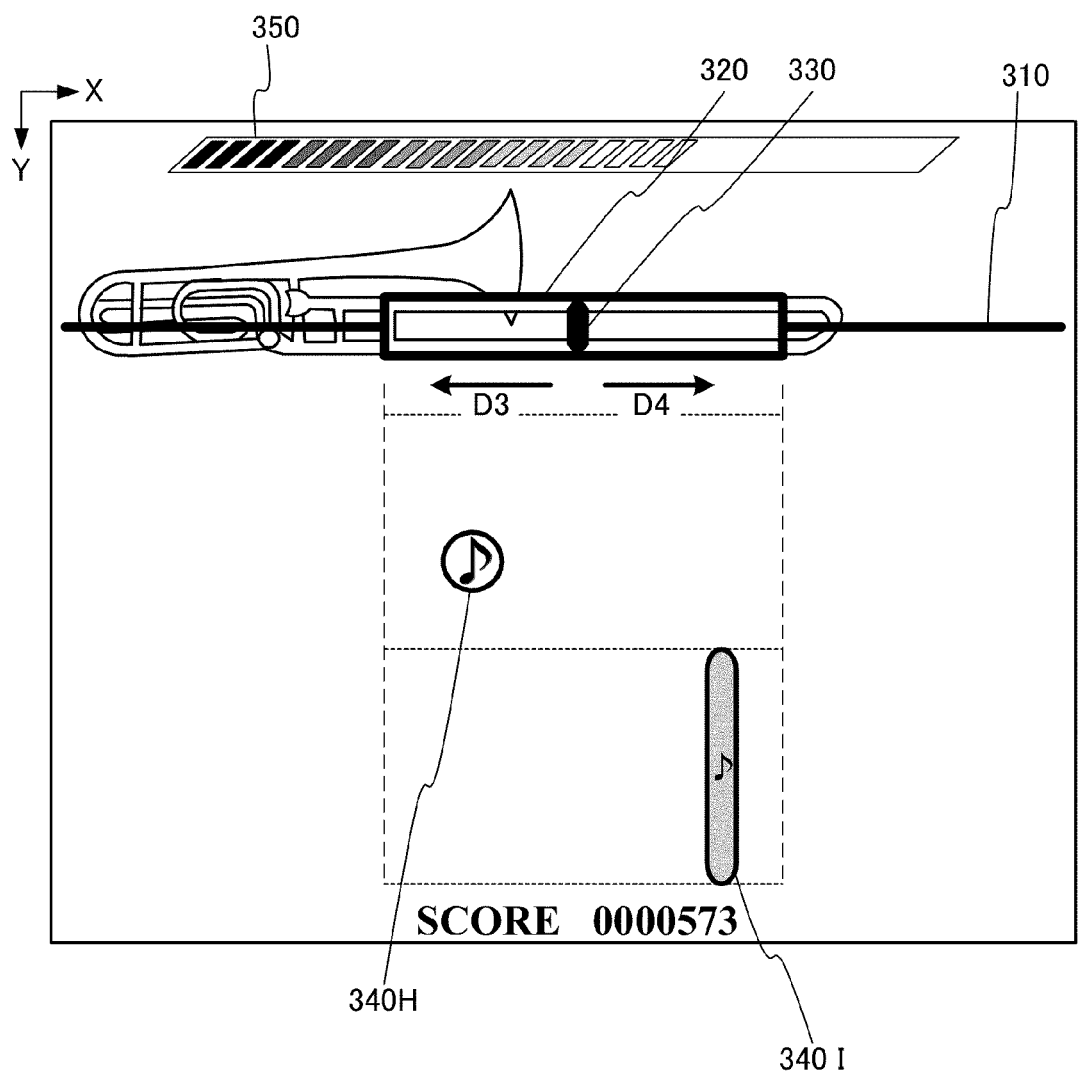
FIG. 16 is a diagram showing further other configuration example (a moving object is moved in a horizontal direction) of a game screen.

The direction in which the moving object 330 is to be moved and the direction in which the musical performance instruction mark 340 scrolls are not limited to the foregoing embodiments of the present application. For example, as shown in FIG. 16, the moving object 330 may be moved in a rightward and leftward direction (directions of arrows D3, D4). In the example shown in FIG. 16, the musical performance instruction marks 340H, 340I scroll in the upward and downward direction.

In each of the foregoing embodiments, the CPU 101 preferably outputs a sound associated with a position correlating with an instruction input, when the position specified by the instruction input matches a position specified by a game task. However, the CPU 101 may output a sound associated with a game task. In this case, an i-th game task P(i) can be expressed as, for example, [equation 8].

$$P(i)=(T(i),(X(i),Y(i)),S(i))$$ [Equation 8]

Note that S(i) is a parameter specifying a sound to be output. For example, S(i) specifies a musical scale, such as "do", "re", or "mi", and a file name of music data to be played.

A program which allows a computer to function as a part of or a whole gaming device 200 may be stored in a computer-readable recording medium, such as a memory card, a CD-ROM, a DVD, or an MO (Magneto Optical disk) and distributed, and, installed in another computer to function in such a computer using the foregoing means or to execute the foregoing processes.

The program may be stored in a disk device of a server device over the Internet, and for example, superimposed on a carrier wave, and downloaded by a computer.

As explained above, according to the present application, there are provided a gaming device which realizes a game that allows a player to obtain the feeling of playing various musical instruments through a simple operation, a game processing method, and an information memory medium.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A gaming device for allowing a player to play a musical instrument in a music game, comprising:
   an input receiving unit that receives an instruction input that specifies an input position where a moving object movable in a predetermined pathway is to be placed;
   a memory unit which stores a plurality of timings and a plurality of stored positions where the moving object is to be placed, each of the plurality of timings and each of the plurality of stored positions being associated with each other; and
   a sound outputting unit which outputs a background sound during play of the music game,
   wherein at each one of the plurality of timings, when the received input position matches the stored position associated with the respective one of the plurality of timings, the sound outputting unit outputs a second sound associated with the position associated with the one of the plurality of timings, the second sound being initiated by the sound outputting unit at the position associated with the respective one of the plurality of timings even if the stored position associated with the respective one of the plurality of timings is achieved by the instruction input prior to the respective one of the plurality of timings, the sound outputting unit combining the background sound and the second sound, the second sound corresponding to a sound that should be played by the musical instrument being played by the player.

2. The gaming device according to claim 1, wherein
   the moving object is a predetermined image displayed on a touch screen, and
   the input receiving unit receives a dragging operation of the predetermined image on the touch screen as the instruction input of specifying a destination point reached by the dragging operation.

3. The gaming device according to claim 2, wherein
   the input receiving unit accepts the instruction input of specifying, as the destination point reached by the dragging operation, a point where the dragging operation of the predetermined image is terminated, or a point nearby the predetermined image, at which an amount of move from a point at which the predetermined image is originally located becomes less than a predetermined value.

4. The gaming device according to claim 1, further comprising a supporting body provided with a predetermined pathway,
   wherein when the player grabs and moves the supporting body, the input receiving unit receives the instruction input of specifying a position where the moving object is to be moved.

5. The gaming device according to claim 1, wherein
   the memory unit further stores an output time length in association with each of the plurality of timings, and
   wherein the sound outputting unit outputs the sound associated with the matching stored position for the output time length at each of the plurality of timings.

6. The gaming device according to claim 1, further comprising a display unit which displays an instruction mark indicating one of the plurality of timings and one of the plurality of stored positions stored in the memory unit,
   wherein the display unit displays the instruction mark while moving the instruction mark toward the pathway as time elapses.

7. The gaming device according to claim 1, wherein the sound outputting unit outputs a sound having a pitch, a musical scale, or a frequency associated with the matching position.

8. The gaming device according to claim 1, wherein
   a first moving object and a second moving object exist as the moving object,
   the input receiving unit receiving a first instruction input of specifying a first moving object position of the first moving object, and a second instruction input of specifying a second moving object position of the second moving object,
   the memory unit stores, for each of the plurality of timings, the timing and a moving object position where the first moving object and/or the second moving object is to be moved in association with each other, and when at each of the plurality of timings, the first moving object position specified by the first instruction input and/or the second moving object position specified by the second instruction input received at the timing matches the moving object position stored in association with the timing, the sound outputting unit outputs the sound associated with the matching position.

9. A game processing method, for allowing a player to play a musical instrument in a music game, executed by a gaming device including an input receiving unit, a memory unit, and a sound outputting unit, the memory unit storing a plurality of timings and a plurality of stored positions where a moving object movable in a predetermined pathway is to be placed, each of the plurality of timings and each of the plurality of positions being associated with each other, and the method comprising:

an input receiving step in which the input receiving unit receives an instruction input of specifying an input position where the moving object is to be arranged; and a sound outputting step that the sound outputting unit outputs a background sound during play of the music game, wherein at each one of the plurality of timings, when the received input position matches the stored position associated with the respective one of the plurality of timings, the sound outputting unit outputs a second sound associated with the position associated with the one of the plurality of timings, the second sound being initiated by the sound outputting unit at the position associated with the respective one of the plurality of timings even if the stored position associated with the respective one of the plurality of timings is achieved by the instruction input prior to the respective one of the plurality of timings, the sound outputting unit combining the background sound and the second sound, the second sound corresponding to a sound that should be played by the musical instrument being played by the player.

10. A non-transitory computer-readable information memory medium storing a program, for allowing a player to play a musical instrument in a music game, which allows a computer to function as:

an input receiving unit which receives an instruction input that specifies an input position where a moving object movable in a predetermined pathway is to be placed;

a memory unit which stores a plurality of timings and a plurality of stored positions where the moving object is to be placed, each of the plurality of timings and each of the plurality of positions being associated with each other; and a sound outputting unit which outputs a background sound during play of the music game, wherein at each one of the plurality of timings, when the received input position matches the stored position associated with the respective one of the plurality of timings, the sound outputting unit outputs a second sound associated with the position associated with the one of the plurality of timings, the second sound being initiated by the sound outputting unit at the position associated with the respective one of the plurality of timings even if the stored position associated with the respective one of the plurality of timings is achieved by the instruction input prior to the respective one of the plurality of timings, the sound outputting unit combining the background sound and the second sound, the second sound corresponding to a sound that should be played by the musical instrument being played by the player.

* * * * *